(12) United States Patent
Ejima et al.

(10) Patent No.: US 8,274,568 B2
(45) Date of Patent: Sep. 25, 2012

(54) METHOD FOR IMAGE DATA PRINT CONTROL, ELECTRONIC CAMERA AND CAMERA SYSTEM

(75) Inventors: Satoshi Ejima, Tokyo (JP); Tomoaki Kawamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/929,289

(22) Filed: Jan. 12, 2011

(65) Prior Publication Data

US 2011/0109772 A1 May 12, 2011

Related U.S. Application Data

(60) Continuation of application No. 11/898,866, filed on Sep. 17, 2007, now abandoned, which is a division of application No. 10/218,561, filed on Aug. 15, 2002, now Pat. No. 7,286,160, which is a continuation-in-part of application No. 10/115,912, filed on Apr. 5, 2002, now abandoned.

(30) Foreign Application Priority Data

| Apr. 5, 2001 | (JP) | 2001-107244 |
| Apr. 5, 2001 | (JP) | 2001-107245 |
| Aug. 17, 2001 | (JP) | 2001-247839 |

(51) Int. Cl.
*H04N 5/225* (2006.01)
(52) U.S. Cl. ............ 348/207.2; 348/333.02; 348/222.1
(58) Field of Classification Search ............. 348/207.2, 348/552, 135, 240.99, 240.1, 240.2, 240.3, 348/333.01, 333.02, 333.03; 358/1.2, 1.6
See application file for complete search history.

(56) References Cited

U.S. PATENT DOCUMENTS

| 5,319,403 A | 6/1994 | Sakamoto et al. |
| 5,331,419 A | 7/1994 | Yamada et al. |
| 5,430,832 A | 7/1995 | Imaizumi et al. |
| 5,659,809 A | 8/1997 | Nagao |
| 5,659,832 A | 8/1997 | Nishizawa et al. |
| 5,873,007 A | 2/1999 | Ferrada Suarez |
| 6,549,307 B1 | 4/2003 | Makishima et al. |
| 2002/0006235 A1 | 1/2002 | Takahashi |
| 2007/0013781 A1 | 1/2007 | Kageyama et al. |

FOREIGN PATENT DOCUMENTS

| JP | A-4-109774 | 4/1992 |
| JP | A-4-130867 | 5/1992 |
| JP | A-4-245782 | 9/1992 |
| JP | A-04-326263 | 11/1992 |

(Continued)

OTHER PUBLICATIONS

May 10, 2011 Office Action issued in Japanese Patent Application No. 2001-247839 (with English Translation).

(Continued)

*Primary Examiner* — Nelson D. Hernández Hernández
(74) *Attorney, Agent, or Firm* — Oliff & Berridge, PLC

(57) ABSTRACT

An electronic camera includes a zoom changing unit that changes a focal length of a zoom lens, an image-capturing unit that executes photoelectric conversion for a subject image projected by the zoom lens onto an image-capturing area, a range finding unit that detects a distance to a subject, a photographic range setting unit that sets a size of a photographic range at a subject position, and a zoom control unit that controls the zoom changing unit based upon the photographic range that has been set and the subject distance so that the subject within the photographic range is projected almost over the entirety of the image-capturing area.

16 Claims, 28 Drawing Sheets

FOREIGN PATENT DOCUMENTS

| | | |
|---|---|---|
| JP | A-04-326264 | 11/1992 |
| JP | A-5-64045 | 3/1993 |
| JP | A-05-068202 | 3/1993 |
| JP | A-5-284331 | 10/1993 |
| JP | A-06-123917 | 5/1994 |
| JP | A-6-292047 | 10/1994 |
| JP | A-7-284047 | 10/1995 |
| JP | A-08-220603 | 8/1996 |
| JP | A-09-006944 | 1/1997 |
| JP | A-10-271370 | 10/1998 |
| JP | A-10-341373 | 12/1998 |
| JP | A-11-41549 | 2/1999 |
| JP | A-11-109213 | 4/1999 |
| JP | A-11-127323 | 5/1999 |
| JP | A-11-187309 | 7/1999 |
| JP | A-11-191873 | 7/1999 |
| JP | A-11-218820 | 8/1999 |
| JP | A-11-298763 | 10/1999 |
| JP | A-11-305295 | 11/1999 |
| JP | A-11-344311 | 12/1999 |
| JP | A-2000-36920 | 2/2000 |
| JP | A-2000-101990 | 4/2000 |
| JP | A-2000-201293 | 7/2000 |
| JP | A-2000-358206 | 12/2000 |
| JP | A-2001-014453 | 1/2001 |

OTHER PUBLICATIONS

Jan. 5, 2010 Office Action issued in corresponding Japanese Application No. 2001-107244.

Jan. 12, 2010 Office Action issued in corresponding Japanese Application No. 2001-107245.

May 25, 2010 Notice of Reasons for Rejection issued in corresponding Japanese Application No. 2001-247839.

Jan. 24, 2012 Office Action issued in Japanese Patent Application No. 2001-247839 (with translation).

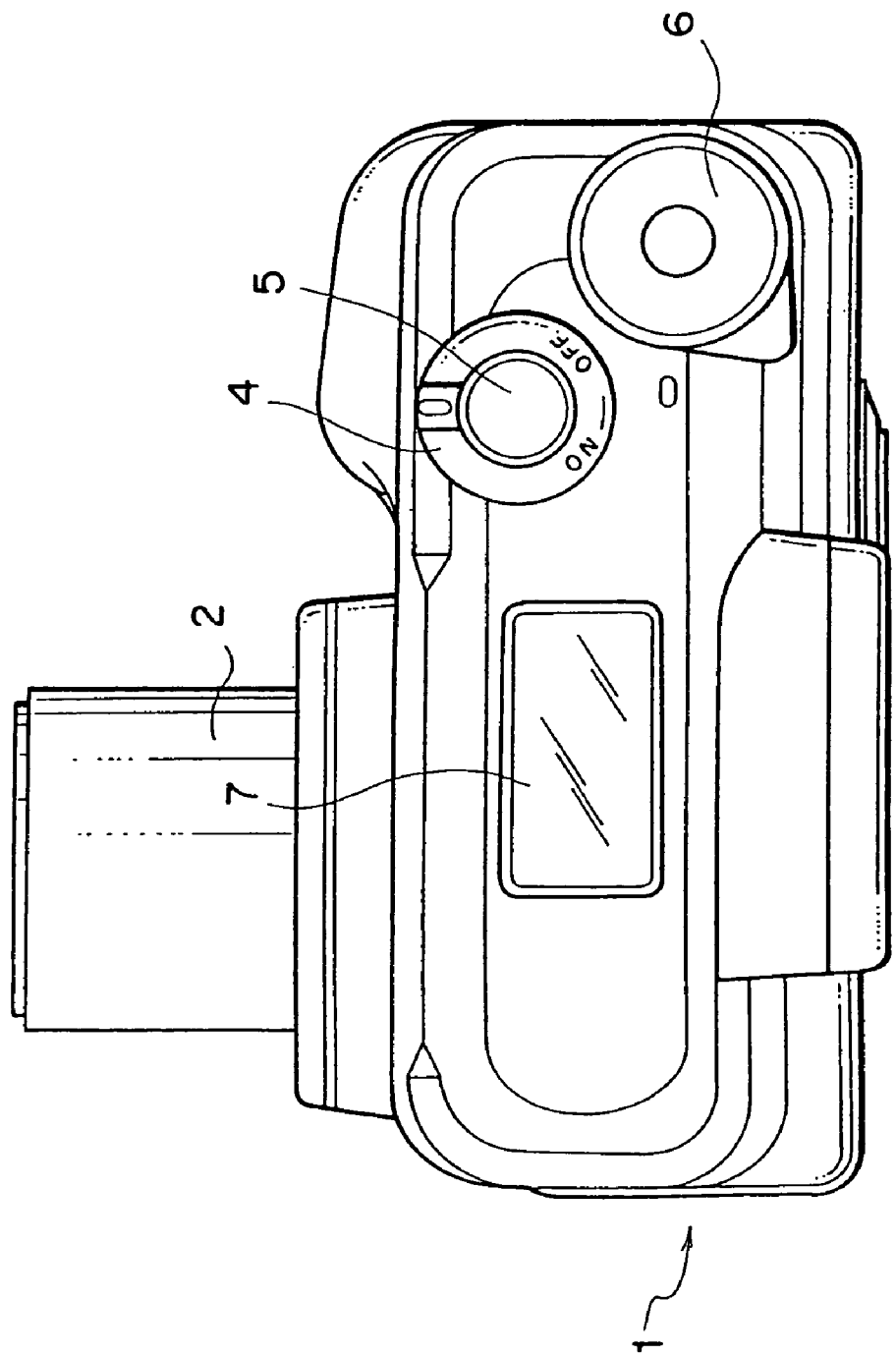

2: PHOTOGRAPHIC OPTICAL SYSTEM
214: CCD
W: PHOTOGRAPHIC RANGE

2: PHOTOGRAPHIC OPTICAL SYSTEM
214: CCD
W: PHOTOGRAPHIC RANGE $f = f_{max} < f_0$ $f = f_{max}$ ELECTRONIC ZOOM MAGNIFICATION FACTOR $M_{max}$ ELECTRONIC ZOOM MAGNIFICATION FACTOR $f_0 / f_{max}$

METHOD FOR IMAGE DATA PRINT CONTROL, ELECTRONIC CAMERA AND CAMERA SYSTEM

This is a Continuation of U.S. patent application Ser. No. 11/898,866 filed Sep. 17, 2007, which in turn is a Divisional of U.S. patent application Ser. No. 10/218,561 filed Aug. 15, 2002, which in turn is a continuation-in-part of U.S. patent application Ser. No. 10/115,912 filed Apr. 5, 2002 (now abandoned). The disclosure of each of these prior applications is incorporated herein by reference in its entirety.

INCORPORATION BY REFERENCE

The disclosures of the following priority applications are herein incorporated by reference:

Japanese Patent Application No. 2001-107244 filed Apr. 5, 2001

Japanese Patent Application No. 2001-107245 filed Apr. 5, 2001

Japanese Patent Application No. 2001-247839 filed Aug. 17, 2001

U.S. patent application Ser. No. 10/115,912 filed Apr. 5, 2002

BACKGROUND OF THE INVENTION

1. Field of the Invention

The present invention relates to a method for image data print control, an electronic camera and a camera system.

2. Description of the Related Art

After a photographing operation is performed in an electronic camera, the data constituting the photographed image are normally taken into a personal computer via a recording medium such as a memory card, a communication cable or the like in the related art. The image thus taken into the personal computer can be printed out by utilizing a printer. The image can be printed in this situation by specifying the printing size and the printing resolution in, for instance, a printing application software program.

However, while the image can be printed in a desired printing size at a desired printing resolution, there is no appropriate method that may be adopted to print the photographed subject in original size (magnification factor 1) or to print the photographed subject at a specified magnification factor.

SUMMARY OF THE INVENTION

An object of the present invention is to provide a method for image data print control that enables printing of a subject image at a magnification factor of 1 and also at a specified magnification factor, and an electronic camera and a camera system that are capable of performing a photographing operation by taking into consideration possible eventualities of printing at a magnification factor of 1 or at a specified magnification factor to facilitate a printing operation at a magnification factor of 1 or at a specified magnification factor.

A method for image data print control according to the present invention, comprises: obtaining subject image data which is obtained by capturing an image of a subject formed through a photographic optical system and output by an image-capturing element having a plurality of pixels; obtaining a distance to the subject; obtaining a number of pixels provided at the image-capturing element; obtaining a pixel pitch at the image-capturing element; obtaining a focal length of the photographic optical system; and calculating a printing resolution so as to print the image of the subject in a size equal to a size of the subject by using the subject image data, based upon the distance to the subject, the number of pixels at the image-capturing element, the pixel pitch at the image-capturing element and the focal length of the photographic optical system.

In this method for image data print control, it is preferred that: obtaining a printing magnification factor is further provided; and after the printing magnification factor is obtained, a printing resolution is calculated so as to print the image of the subject in a size achieved by enlarging the size of the subject by the printing magnification factor that has been obtained by using the subject image data, based upon the distance to the subject, the number of pixels at the image-capturing element, the pixel pitch at the image-capturing element and the focal length of the photographic optical system.

An electronic camera according to the present invention comprises: a photographic optical system; an image-capturing element having a plurality of pixels that captures an image of a subject formed through the photographic optical system and outputs image data constituting the image thus obtained; a range finding device that detects a distance to the subject; a calculating device that obtains a number of pixels at the image-capturing element, a pixel pitch at the image-capturing element and a focal length of the photographic optical system, and calculates a printing resolution so as to print the image of the subject in a size equal to a size of the subject by using the subject image data, based upon the distance to the subject that has been detected, the number of pixels at the image-capturing element, the pixel pitch at the image-capturing element and the focal length of the photographic optical system; and a recording control device that records the printing resolution that has been calculated into a recording medium together with the image data.

Another electronic camera according to the present invention comprises: an image-capturing unit that implements photoelectric conversion on a subject image projected onto an image-capturing area by a photographic optical system; a range finding unit that detects a subject distance; a photographic range calculating unit that calculates a photograph range over which the image-capturing area at the image-capturing unit is projected at a position corresponding to the subject distance by the photographic optical system; a printing resolution calculating unit that calculates a printing resolution so as to print the subject image based upon image information output by the image-capturing unit in a size substantially equal to the photographic range, based upon the photographic range and the number of pixels provided at the image-capturing unit; and a storage control unit that stores the printing resolution into a storage area together with the image information.

Another electronic camera according to the present invention comprises: an image-capturing unit that implements photoelectric conversion on a subject image projected onto an image-capturing area by a photographic optical system; a range finding unit that detects a subject distance; a photographic range calculating unit that calculates a photograph range over which the image-capturing area at the image-capturing unit is projected at a position corresponding to the subject distance by the photographic optical system; a magnification factor setting unit that sets a printing magnification factor; a printing resolution calculating unit that calculates a printing resolution so as to print the subject image based upon image information output by the image-capturing unit in a size substantially equal to a size achieved by multiplying a size of the photographic range by the printing magnification factor, based upon the photographic range, a number of pixels provided at the image-capturing unit and the printing magnification factor; and a storage control unit that stores the printing resolution into a storage area together with the image information.

In the above electronic cameras, it is preferred that: a display monitor that selectively displays a subject image captured by the image-capturing unit and a subject image based upon the image information stored in the storage area, is further provided; and a display magnification factor representing a ratio of a size of a display range of the display monitor and a value obtained by dividing the number of pixels by the printing resolution is displayed at the display monitor together with the subject image.

In the above electronic cameras, it is preferred that: the photographic optical system is constituted of a zoom optical system; an execution mode in which the printing resolution is calculated and the printing resolution is stored into the storage area and a non-execution mode in which no printing resolution is calculated and stored are provided; a mode setting unit that selectively sets either the execution mode or the non-execution mode is provided; a zoom changing unit that changes a focal length of the zoom optical system is provided; and a zoom control unit that controls the zoom changing unit so that a zoom position of the zoom optical system achieves a predetermined focal length when the mode setting unit sets the execution mode, is provided. In this case, it is preferred that the zoom control unit controls the zoom changing unit so that the zoom optical system enters a macro photographing state when the mode setting unit sets the execution mode. Furthermore, it is preferred that a clearing unit that clears the macro photographing state and a mode control unit that switches from the execution mode to the non-execution mode when the clearing unit clears the macro photographing state in the execution mode, are provided.

In the above electronic cameras, it is preferred that a warning unit that engages in a warning operation when the subject distance is not within a predetermined range, is provided.

A camera system according to the present invention comprises: an electronic camera; and a printing device. The electronic camera comprises: an image-capturing unit that implements photoelectric conversion on a subject image projected onto an image-capturing area by a photographic optical system; a range finding unit that detects a subject distance; a photographic range calculating unit that calculates a photograph range over which the image-capturing area at the image-capturing unit is projected at a position corresponding to the subject distance by the photographic optical system; a printing resolution calculating unit that calculates a printing resolution so as to print the subject image based upon image information output by the image-capturing unit in a size substantially equal to the photographic range, based upon the photographic range and a number of pixels provided at the image-capturing unit; and a storage control unit that stores the printing resolution into a storage area together with the image information, and the printing device prints the subject image based upon the printing resolution and the image information stored in the storage area.

Another camera system according to the present invention comprises: an image-capturing unit that implements photoelectric conversion on a subject image projected onto an image-capturing area by a photographic optical system; a range finding unit that detects a subject distance; a photographic range calculating unit that calculates a photograph range over which the image-capturing area at the image-capturing unit is projected at a position corresponding to the subject distance by the photographic optical system; a printing resolution calculating unit that calculates a printing resolution so as to print the subject image based upon image information output by the image-capturing unit in a size substantially equal to the photographic range, based upon the photographic range and a number of pixels provided at the image-capturing unit; and a printing device that prints the subject image based upon the printing resolution and the image information.

In the above camera systems, it is preferred that: an image processing unit that processes the image information if the printing resolution is not within a printing resolution range set in advance, so as to achieve a predetermined printing resolution within the printing resolution range, is provided; and the printing device prints the subject image based upon the image information having been processed at the image processing unit and the predetermined printing resolution.

Another electronic camera according to the present invention comprises: an image-capturing unit that implements photoelectric conversion on a subject image projected onto an image-capturing area by a photographic optical system; a range finding unit that detects a subject distance; a photographic range calculating unit that calculates a photograph range over which the image-capturing area at the image-capturing unit is projected at a position corresponding to the subject distance by the photographic optical system; a printing resolution calculating unit that calculates a printing resolution so as to print the subject image based upon image information output by the image-capturing unit in a size substantially equal to the photographic range, based upon the photographic range and a number of pixels provided at the image-capturing unit; a storage control unit that stores the printing resolution into the storage area together with the image information; a display monitor that displays the subject image captured by the image-capturing unit; a printing size storage unit having stored therein at least one of various printing sizes; and a monitor control unit that controls the display monitor so as to display at least one of marks indicating the printing sizes together with the subject image.

In this electronic camera, it is preferred that: a reproduction mode in which the subject image based upon the image information stored in the storage area is displayed at the display monitor, is provided; and when the reproduction mode is selected, the monitor control unit controls the display monitor so as to display the mark together with the subject image.

Also, it is preferred that an input unit that inputs the printing sizes to the printing size storage unit is provided.

Also, it is preferred that the mark displayed at the display monitor is a rectangular frame indicating the printing size. In this case, it is preferred that: a correction unit that captures an image of a reference rectangular frame having a size equal to the printing size and corrects the printing resolution based upon a printing resolution at which the rectangular frame corresponding to the printing size matches the image of the reference rectangular frame on the display monitor and a value obtained by dividing the number of pixels by the size of the reference rectangular frame, is provided; and the storage control unit stores the printing resolution having been corrected by the correction unit into the storage area together with the image information.

Also, it is preferred that the monitor control unit controls the display monitor so as to display a center mark indicating a central position of the display monitor.

Also, it is preferred that: a selection unit that selects one of the printing sizes stored in the printing size storage unit, and a decision-making unit that makes a decision as to whether or not the photographic range calculated by the photographic range calculating unit is equal to or smaller than the printing size selected by the selection unit, are provided; and the monitor control unit controls the display monitor so as to display a decision making mark indicating decision results obtained at the decision-making unit.

Another electronic camera according to the present invention comprises: a zoom changing unit that changes a focal length of a zoom lens; an image-capturing unit that executes photoelectric conversion for a subject image projected by the zoom lens onto an image-capturing area; a range finding unit that detects a distance to a subject; a photographic range setting unit that sets a size of a photographic range at a subject position; and a zoom control unit that controls the zoom changing unit based upon the photographic range that has been set and the subject distance so that the subject within the photographic range is projected almost over the entirety of the image-capturing area.

Another electronic camera according to the present invention comprises: a zoom changing unit that changes a focal length of a zoom lens; an image-capturing unit that executes photoelectric conversion for an image of a subject projected by the zoom lens onto an image-capturing area; a range finding unit that detects a distance to a subject; a mode setting unit operated to set a specified range photographing mode in which a size of the photographic range at a subject position is fixed at a predetermined size; and a zoom control unit that controls the zoom changing unit based upon the photographic range and the subject distance when the specified range photographing mode is set so that the subject within the photographic range is projected almost over the entirety of the image-capturing area.

In this electronic camera, it is preferred that: a magnification factor setting unit that sets a printing magnification factor is further provided; and the mode setting unit fixes the size of the photographic range at the subject position to a size calculated by dividing the predetermined size by the printing magnification factor.

Also, it is preferred that a size setting unit operated to set the predetermined size is further provided.

Also, it is preferred that there is provided a display monitor at which a subject image based upon image information provided by the image-capturing unit and a range indicator mark indicating a range substantially corresponding to the photographic range superimposed on the subject image are brought up on display when the focal length of the zoom lens is at a maximum and a size of a range of the subject projected almost over the entirety of the image-capturing area is larger than the size of the photographic range. In this case, it is preferred that a storage control unit that stores image information over the range indicated by the range indicator mark into a storage area is further provided. Furthermore, it is preferred that the storage control unit stores the predetermined size into the storage area in correspondence to the image information.

Also, it is preferred that there are further provided: an electronic zoom unit that electronically enlarges a part of a subject image achieved based upon image information provided by the image-capturing unit; and an electronic zoom control unit that controls the electronic zoom unit when the focal length of the zoom lens is at a maximum and a size of a range of the subject projected almost over the entirety of the image-capturing area is larger than the size of the photographic range, so as to enlarge an image corresponding to the subject within the photographic range in the subject image achieved based upon the image information from the image-capturing unit to a size matching a size of the subject image.

Also, it is preferred that there is further provided a warning unit that issues a warning if the focal length of the zoom lens is at a minimum and a size of a range of the subject projected almost over the entirety of the image-capturing area is smaller than the size of the photographic range.

Also, it is preferred that there is further provided a sub-sampling unit that electronically sub-samples the subject image when the focal length of the zoom lens is at a minimum and a size of a range of the subject projected almost over the entirety of the image-capturing area is smaller than the size of the photographic range.

Also, it is preferred that there is further provided a display unit at which a mark indicating the predetermined size is displayed.

Another electronic camera according to the present invention comprises: a zoom changing unit that changes a focal length of a zoom lens; an image-capturing unit that executes photoelectric conversion for an image of a subject projected by the zoom lens onto an image-capturing area; a range finding unit that detects a distance to a subject; a mode setting unit operated to set a specified range photographing mode in which a size of the photographic range at a subject position is fixed at a predetermined size; a focal length calculating unit that calculates a focal length at which the subject within the photographic range is projected almost over the entirety of the image-capturing area when the specified range photographing mode is set, based upon (a) a plurality of focal lengths assumed by the zoom lens, (b) subject distances detected in correspondence to the plurality of focal lengths when a reference image at the predetermined size is projected almost over the entirety of the image-capturing area and (c) the distance to the subject detected when an image of the subject is captured; and a zoom control unit that controls the zoom changing unit so as to match the focal length of the zoom lens with the focal length calculated at the focal length calculating unit.

Another electronic camera according to the present invention comprises: a mode setting unit operated to set a specified range photographic mode in which a size of a photographic range at the subject position is fixed to a predetermined size; an image-capturing unit that executes photoelectric conversion for a subject projected onto an image-capturing area by a photographic optical system; an electronic zoom unit that electronically enlarges a part of a subject image achieved based upon image information provided by the image-capturing unit; and an electronic zoom control unit that controls the electronic zoom unit so as to enlarge an image corresponding to the photographic range in the subject image to a size matching a size of the subject image.

A camera system according to the present invention comprises: a zoom changing unit that changes a focal length of a zoom lens; an image-capturing unit that executes photoelectric conversion for an image of a subject projected by the zoom lens onto an image-capturing area; a range finding unit that detects a distance to a subject; a mode setting unit operated to set a specified range photographing mode in which a size of the photographic range at a subject position is fixed at a predetermined size; and a zoom control unit that controls the zoom changing unit based upon the photographic range and the subject distance when the specified range photographing mode is set so that the subject within the photographic range is projected almost over the entirety of the image-capturing area; and a printing device that prints an image photographed in the specified range photographing mode in a size substantially matching the predetermined size.

A computer-readable computer program product according to the present invention contains a control program for image data print control. The control program for image data print control comprises: an instruction for obtaining subject image data which is obtained by capturing an image of the subject formed through a photographic optical system output by an image-capturing element having a plurality of pixels; an instruction for obtaining a distance to the subject; an instruction for obtaining a number of pixels provided at the image-capturing element; an instruction for obtaining a pixel pitch at the image-capturing element; an instruction for obtaining a focal length of the photographic optical system; and an instruction for calculating a printing resolution so as to print the subject image in a size equal to a size of the subject by using the subject image data, based upon the distance to the subject, the number of pixels at the image-capturing element, the pixel pitch at the image-capturing element and the focal length of the photographic optical system.

It is preferred that: this computer-readable computer program product is a recording medium in which the control program for image data print control is recorded; or the computer-readable computer program product is a carrier wave in which the control program for image data print control is embodied as a data signal.

BRIEF DESCRIPTION OF THE DRAWINGS

FIGS. 1A and 1B show an electronic camera according to the present invention achieved in an embodiment, with FIG. 1A presenting a plan view of the electronic camera and FIG. 1B presenting a rear view of the electronic camera;

FIGS. 10A and 10B illustrate the rectangular frame R in variation 1, with FIG. 10A illustrating the relationship between the rectangular frame R and the areas S1~S3 and FIG. 10B showing a display that includes the mark 37a;

FIG. 27 illustrates how the program may be provided through a recording medium or a data signal on the Internet or the like.

DESCRIPTION OF THE PREFERRED EMBODIMENTS

Figure 1B:
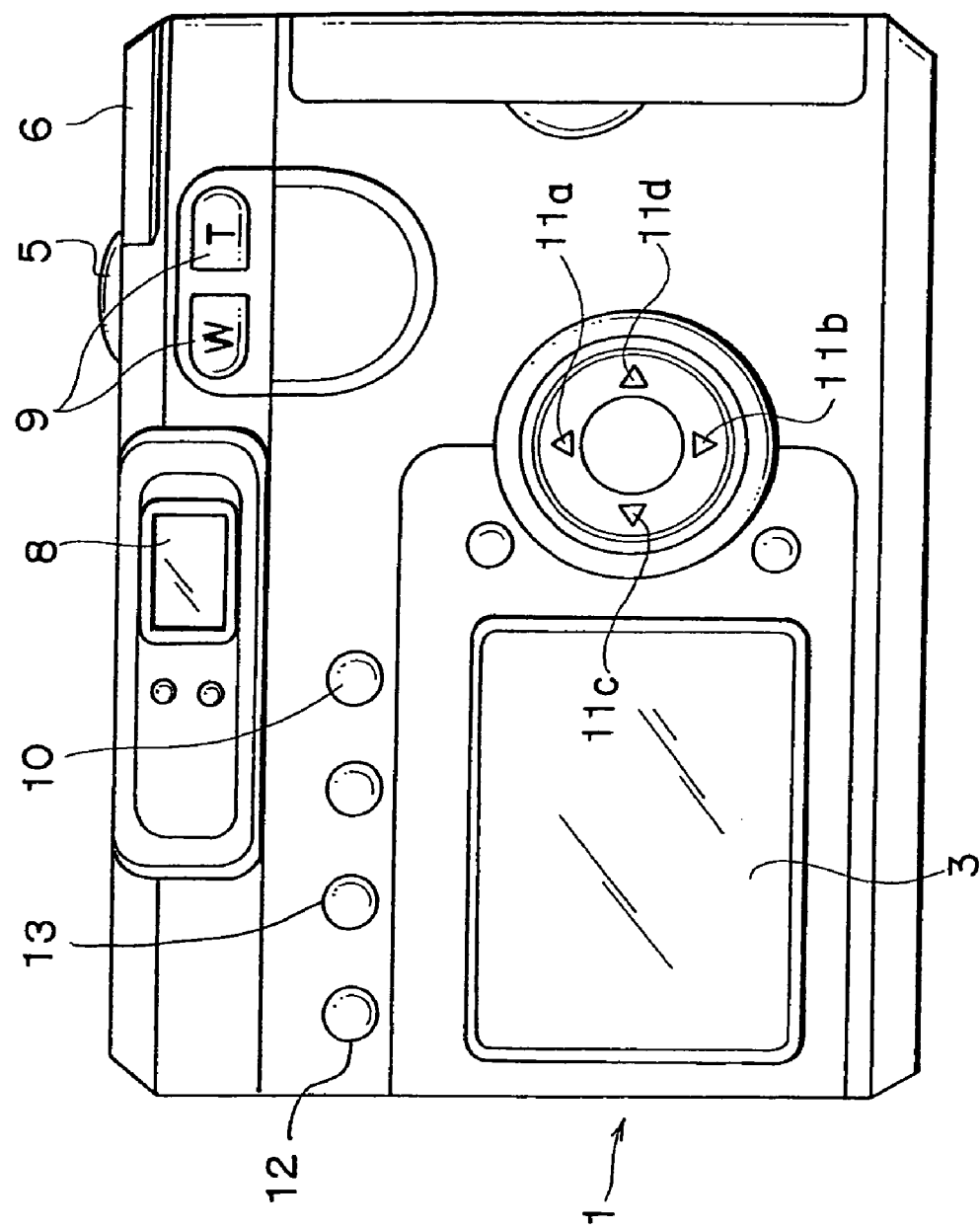

The following is an explanation of the embodiments of the present invention
- First Embodiment- FIGS. 1A and 1B show the electronic camera according to the present invention achieved in an embodiment, with FIG. 1A presenting a plan view of the electronic camera and FIG. 1B presenting a rear view of the camera. As shown in FIG. 1A, at the upper surface of an electronic camera 1, a main switch 4 through which a power on/off operation is performed, a shutter release button 5, a dial (command dial) 6 operated to select a recording mode or a reproduction mode and a display panel 7 on which camera information is displayed are provided. The recording mode in this context refers to a mode that allows a subject image to be photographed and the image data to be recorded, whereas the reproduction mode refers to a mode in which the recorded image data are read out and are reproduced and displayed on a display LCD 3 (see FIG. 1B) provided at the rear surface of the camera.

In addition, at the rear surface of the camera, a viewfinder eyepiece window 8, zoom switching buttons 9 operated to zoom a photographic optical system 2 and various operating buttons are provided in addition to the display LCD 3 provided for image display, as shown in FIG. 1B. When the zoom switching button 9 is pressed at the W side, the photographic optical system 2 is driven toward the wide angle side and when the zoom switching button 9 is pressed at the T side, the photographic optical system 2 is driven toward the telephoto side. In the recording mode, subject images captured by a CCD 214 which is to be detailed later are sequentially displayed on the display LCD 3, whereas a thumbnail display of images stored in a memory card 424 to be detailed later or a display of an individual reproduced image is brought up on the display LCD 3 when the reproduction mode is selected.

Reference numeral 10 indicates a menu button operated to display a setting menu, and while the setting menu is on display, items to be set are selected through selector buttons 11a~11d to make various settings. When setting the printing size, as explained later, the buttons 10 and 11a~11d are operated to bring up a printing size setting menu on the display LCD 3 to select a desired size from a plurality of printing sizes on display by operating the selector buttons 11a~11d. In the electronic camera 1 in the embodiment, a specified magnification factor photographing mode which is to be detailed later and a standard photographing mode which is equivalent to the recording mode in electronic cameras in the related art can be selected. Either of these modes can be selected through a mode selector button 12. The individual modes are to be explained in detail later.

Reference numeral 13 indicates a focus mode button operated to switch from one focus mode to another focus mode. In the embodiment, one of three focus modes, i.e., a normal AF mode which is suited to snapshot photographing operations, portrait photographing operations and the like, a macro mode which is suited to photographing a subject set in extremely close proximity to the camera and an infinity mode (or a distant view mode) which is suited to photographing distant views of landscapes, buildings and the like, can be selected. Each time the focus mode button 13 is pressed, one of the three focus modes described above is cyclically selected.

Figure 2:
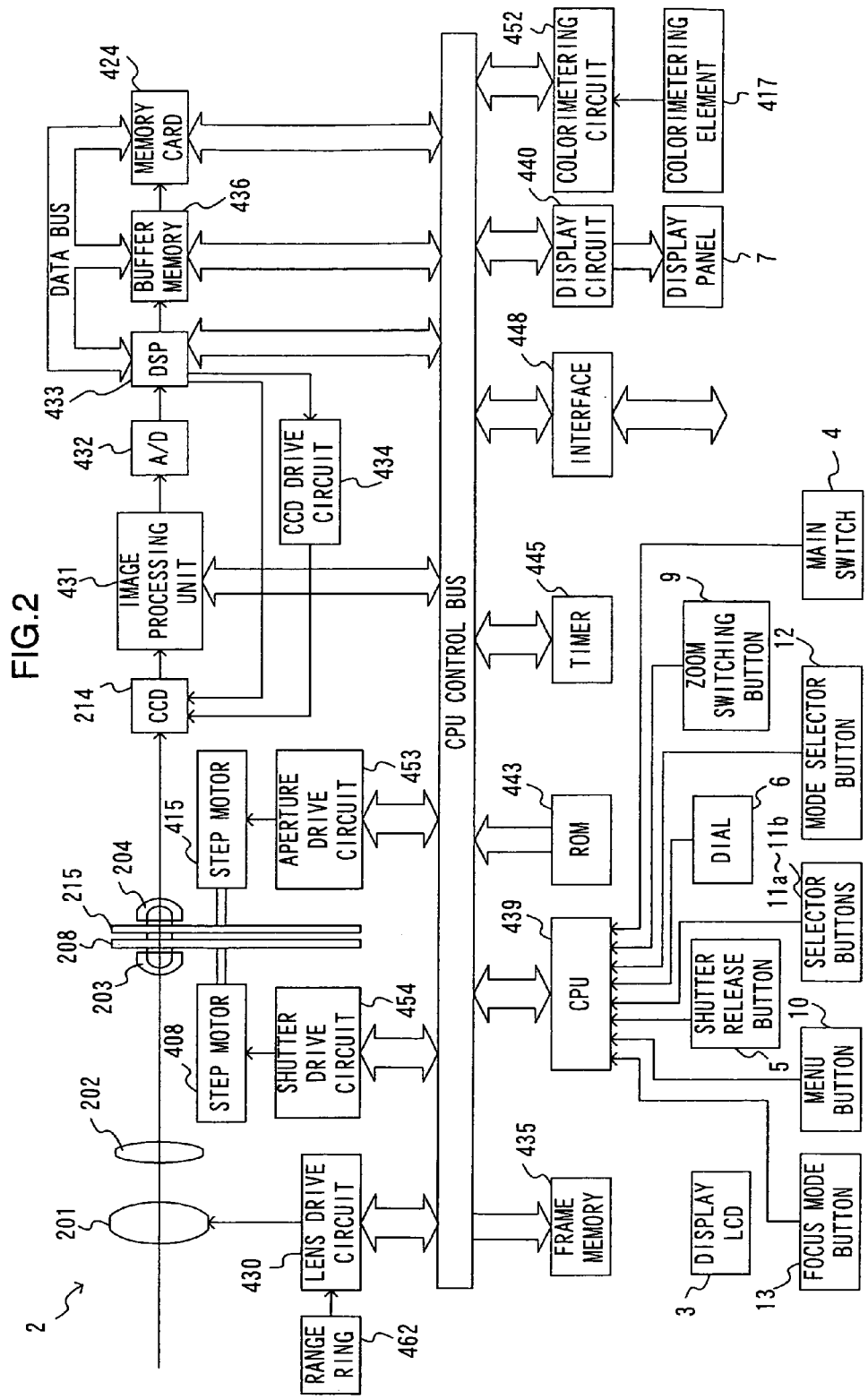
FIG. 2 is a circuits block diagram of the electronic camera shown in FIG. 1.

FIG. 2 is a circuit block diagram of the electronic camera shown in FIG. 1. In a ROM 443, a control program of the electronic camera 1 is stored. By turning on the main switch 4, power to the electronic camera 1 is turned on and the control program is started up by a CPU 439. As the recording mode is selected through the dial 6, the electronic camera 1 enters a photographing-enabled state. If, on the other hand, the reproduction mode is selected through the dial 6, an image can be displayed on the display LCD 3 by reproducing image data recorded in the memory card 424 which is a recording medium. It is to be noted that an image is displayed on the display LCD 3 based upon image-capturing signals provided by the CCD 214 in the recording mode.

The photographic optical system 2 includes a plurality of lenses 201~204 and a focal adjustment operation is performed by a lens drive circuit 430. While the focal adjustment operation by the lens drive circuit 430 is normally executed in response to a command issued by the CPU 439, a focal adjustment operation can also be performed in response to an operation signal which is output when a range ring 462 is manually operated.

A shutter plate 208 and an aperture 215 are provided between the lens 203 and the lens 204 at the photographic optical system 2. Subject light having entered the photographic optical system 2 passes through the lenses 201~204, the shutter plate 208 and the aperture plate 5, and an image is formed on the image-capturing surface of the CCD 214. The aperture plate 215 and the shutter plate 208 each formed in a disk shape are respectively driven by step motors 415 and 408 provided at the centers of rotation of the disks. At the aperture plate 215, a plurality of aperture openings (not shown) with varying opening areas are provided, and a given aperture opening is set on the optical axis by rotating the aperture plate 215 with the step motor 415.

A full light-blocking portion (not shown) that blocks all the light flux having passed through the lens 203 and an opening (not shown) that allows the entire light flux to pass through are provided at the shutter plate 208. During an exposure operation, the opening of the shutter plate 208 is set on the optical path and as the exposure operation ends, of the full light-blocking portion is set on the optical path. Drive control is implemented on the step motor 415 which rotates the aperture plate 215 by a drive circuit 453. The drive all of the step motor 408 which rotates the shutter plate 208 is controlled by a shutter drive circuit 454.

During a photographing operation, the electric charges having been stored at the CCD 214 are first swept out and a specific opening at the aperture plate 215 is set on the optical path. Then, after an exposure operation is performed at the CCD 214 over a predetermined length of time, electric charges are stored at the CCD 214 again. The length of the exposure period corresponds to the length of time that elapses after the electric charges are swept out until the optical path becomes blocked by the full light-blocking portion of the shutter plate 208 again.

When the subject image is formed on the image-capturing surface of the CCD 214 by the photographic optical system 2, a signal electric charge, which corresponds to the intensity level of the subject image light is stored. The CCD 214 is provided with a horizontal drive signal from a digital signal processor (hereafter referred to as a DSP) 433 and a vertical drive signal from a CCD drive circuit 434 which is controlled by the DSP 433. In other words, the operational timing of the CCD 214 is controlled by the DSP 433 and the CCD drive circuit 434 and signals from the CCD 214 are input to an image processing unit 431.

The image processing unit 431, which includes a noise removal circuit and a DC reproduction circuit, implements analog processing such as noise removal and gain control on the image signals output from the CCD 214. The analog image signals output from the image processing unit 431 are converted to digital signals at an analog/digital conversion circuit (hereafter referred to as an A/D conversion circuit) 432. The digital image data resulting from the conversion are input to the DSP 433 mentioned earlier.

At the DSP 433, image processing such as edge compensation, gamma correction and white balance adjustment is performed on the image data output from the A/D conversion circuit 432. In addition, the DSP 433 temporarily stores the image data having undergone various types of image processing into a buffer memory 436 by controlling a data bus connected to the buffer memory 436 and the memory card 424. Subsequently, the image data read out from the buffer memory 436 undergo data compression in a predetermined compression format (e.g., the JPEG format) and the compressed data are recorded into the memory card 424.

In addition, the DSP 433 stores the image data obtained by implementing the image processing described above on the image data resulting from the image-capturing operation at the CCD 214 and image data obtained by decompressing the image data read out from the memory card 424 in a frame memory 435, and displays images based upon these image data at the display LCD 3 provided at the electronic camera 1. The DSP 433 also performs timing management in data input/output when recording the image data into the memory card 424 or recording the decompressed photographic image data into the buffer memory 436.

The buffer memory 436, in which the image data obtained based upon the output from the CCD 214 are temporarily stored, is utilized to reduce the extent of inconsistency in the speed with which image data are input to/output from the memory card 424 and to reduce the difference among the varying processing speeds of the CPU 439, the DSP 433 and the like. A timer 445 which is internally provided with a clock circuit outputs time data indicating the current time point to the CPU 439 and is also utilized as a timer in monitor on/off control which is to be detailed later. The time data are recorded together with the image data explained above into the memory card 424.

A colorimetering element 417 detects the color temperature of a main subject and its surrounding area and outputs data indicating the detected color temperature to a colorimetering circuit 452. The colorimetering circuit 452 implements a specific type of processing on the analog signal output from the colorimetering element 417 to convert them to digital values and outputs the digital signal resulting from the conversion to the CPU 439. An interface 448 is provided so as to allow a specific external apparatus (not shown) to be connected and to enable data exchange between the CPU 439 and the external apparatus connected thereto. Reference numeral 440 indicates a display circuit that controls the display panel 7 to display the details of settings made for the photographing operation on the display panel 7. It is to be noted that the printing size, which is to be explained in detail later, is displayed on the display LCD 3 or the display panel 7.

Next, the operations performed in the electronic camera 1 are explained. As mentioned earlier, either the recording mode or the reproduction mode can be selected through the dial 6 in the electronic camera 1. The recording mode includes a standard photographing mode which is equivalent to the recording mode in electronic cameras in the related art and a specified magnification factor photographing mode. If a photographing operation is performed in the specified magnification factor photographing mode, a printing resolution which will allow the photographed subject image to be printed at the magnification factor that has been set is automatically calculated and this printing resolution is recorded into the memory card 424 together with the image information. By printing the subject image at the printing resolution recorded in the memory card 424, the subject image magnified at the specific magnification factor is printed.

(Standard Photographing Mode)

First, the operation performed in the standard photographing mode which is similar to the operation of electronic cameras in the related art is explained. The dial 6 is operated to select the recording mode or the reproduction mode. The main switch 4 is turned on after setting the recording mode at the dial 6 or the recording mode is set at the dial 6 after turning on the main switch 4 to enable a photographing operation. Image signals output from the CCD 214 first undergo analog processing such as noise removal and gain control at the image processing unit 431 and then are converted to digital signals at the A/D conversion circuit 432. The digitized signals are provided to the DSP 433 where they undergo image preprocessing such as edge compensation and gamma correction before they are temporarily stored into the buffer memory 436.

Subsequently, the image data are exchanged between the CPU 439 and the buffer memory 436, a white balance adjustment value is ascertained by using the image data and a white balance adjustment is executed at the DSP 433 based upon the adjustment value. The image data having undergone the white balance adjustment are stored into the buffer memory 436 again. The image data stored in the buffer memory 436 are processed at the DSP 433 to prepare image data to be displayed on the display LCD 3. The processed image data are written into the frame memory 435 and are displayed on the display LCD 3 as a photographic monitor image referred to as a through image. This through image is sequentially updated over predetermined time intervals based upon the subject light entering the photographic optical system 2 as the operation described above is executed repeatedly.

As the shutter release button 5 is pressed halfway down and a halfway press switch (not shown) is turned on in response, the focal adjustment state of the photographic optical system 2 is detected based upon the contrast of the image data. Namely, the focal adjustment operation is performed by the lens drive circuit 430 so as to form a focused subject image on the CCD 214 based upon the contrast in the image data. In addition, when the shutter release button 5 is pressed halfway down, the CPU 439 detects the brightness level of the subject from the image data and performs an exposure calculation based upon the detected brightness level.

It is to be noted that the focal adjustment operation in the electronic camera 1 can be performed in a mode referred to as a "continuous AF mode" or a mode referred to as a "single AF mode". In the continuous AF mode, the focal adjustment operation is repeatedly executed regardless of whether or not the shutter release button 5 is operated and a focus lock is effected as the shutter release button 5 is pressed halfway down. In the single AF mode, on the other hand, the focal adjustment operation is performed only when the shutter release button 5 is pressed halfway down and then also a focus lock is effected.

As the shutter release button 5 is pressed all the way down after the shutter release button 5 is first pressed halfway down, a full press switch (not shown) is turned on. As a result, the signal charges stored at the CCD 214 are first swept out and then the shutter plate 208 and the aperture plate 215 are driven based upon the results of the exposure calculation to capture an image at the CCD 214.

The image signal output from the CCD 214 through this image-capturing operation first undergo the series of processing explained earlier before it is stored into the buffer memory 436. The image data stored in the buffer memory 436 are written into the frame memory 435 after undergoing the processing at the DSP 433 to be prepared as a image data for display at the display LCD 3 and a photographic image referred to as a freeze image is displayed on the display LCD 3. The image data obtained through such image preprocessing then undergo data compression at the DSP 433, the compressed data are assigned with a specific data name by the CPU 439 and the data are then recorded together with the time information provided by the timer 445 into the memory card 424 constituting a recording medium (a PC card, a CF card or the like) which may be a flash memory.

A zoom signal generated in response to an operation of a zoom switching button 9 and a halfway press operation signal and a full press operation signal generated in response to an operation of the shutter release button 5 are input to the CPU 439. When the zoom switching button 9 is operated toward the telephoto side (T), the CPU 439 drives the lens drive circuit 430 to optically increase the zoom magnification factor. If, on the other hand, the zoom switching button 9 is operated toward the wide-angle side (W), the zoom magnification factor is lowered.

(Specified Magnification Factor Photographing Mode)

Next, an explanation is given on the specified magnification factor photographing mode. A plurality of printing magnification factors M are stored in advance at the ROM 443 in FIG. 2 and a specific printing magnification factor M for the subject image is set by using the menu button 10 and the selector buttons 11a~11d explained earlier in the electronic camera 1 in the embodiment. For instance, if magnification factors of 1, 2 and 3 are stored as the printing magnification factors M, a printing magnification factor setting menu is first brought up at the display LCD 3 by operating the menu button 10. In the printing magnification factor setting menu, the individual magnification factors are listed, and by selecting one of the magnification factors with the selector buttons 11a~11d, the printing magnification factor M is set to the selected value.

While a detailed explanation is to be given later, if the printing magnification factor M is set to 2, for instance, a printing resolution that will allow the image to be printed twice as large as the actual size is calculated. In addition, a plurality of printing sizes are stored in the ROM 443, and one of these printing sizes can be selected in advance with, for instance, the menu button 10 and the selector buttons 11a~11d.

Figure 3:
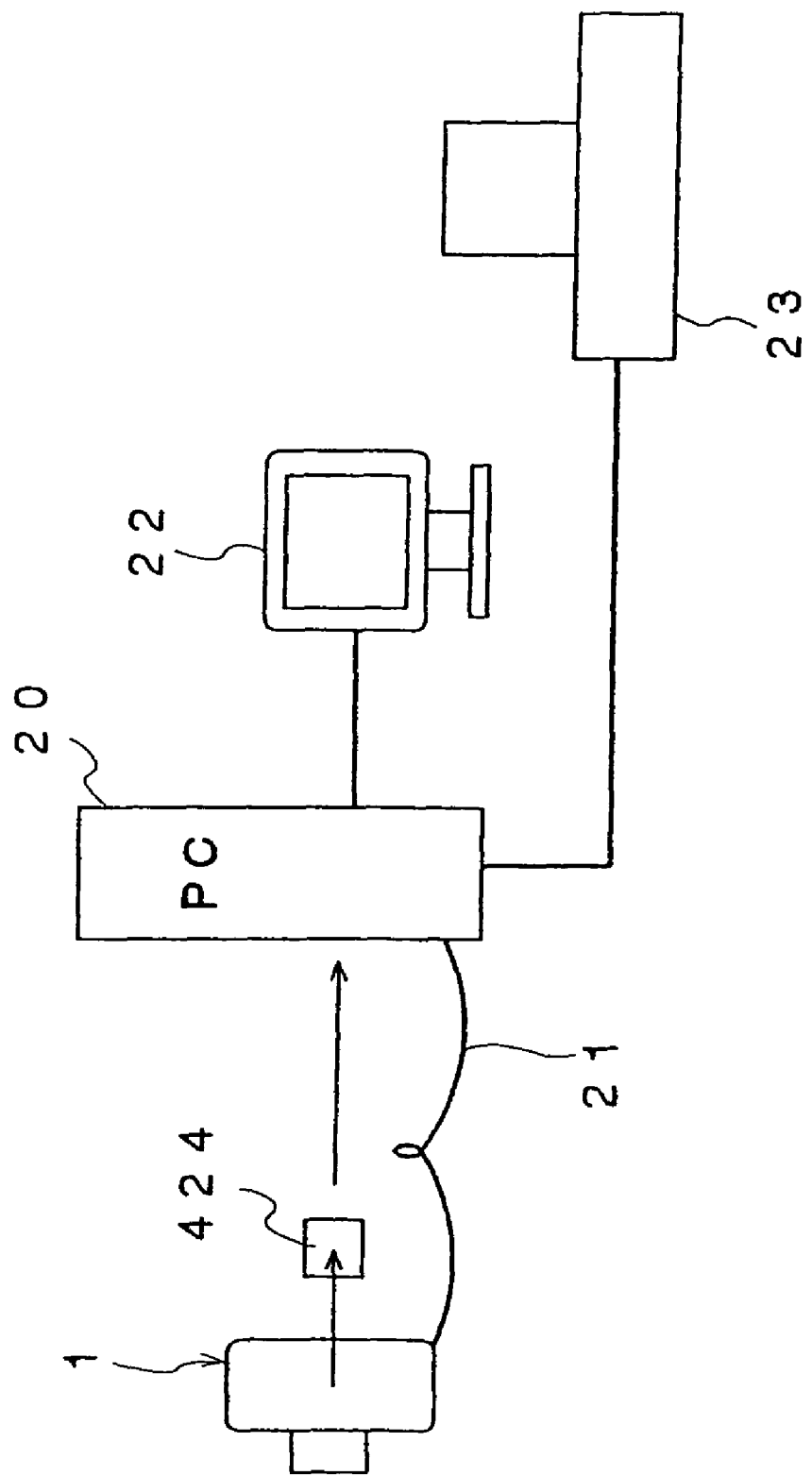
FIG. 3 presents a schematic block diagram of a camera system.

FIG. 3 illustrates a schematic structure that may be adopted in a camera system capable of performing operations from photographing the subject through printing the image at a magnification factor of 1. Image data obtained by performing a photographing operation in the electronic camera 1 are taken into a personal computer 20 via the memory card 424 that can be detachably mounted at the camera 1. Alternatively, the image data may be transferred to the personal computer 20 from the camera 1 via a communication cable 21, or the image data may be transferred to the personal computer 20 wirelessly or via an Internet line. A display monitor 22 and a printer 23 are connected to the personal computer 20. A driver software program for driving the printer 23 is pre-installed in the personal computer 20 so that the resolution and the printing size of the image to be printed can be set freely. It is to be noted that the image data may be directly input to the printer 23 instead of first taking the image data into the personal computer 20.

Figure 4:
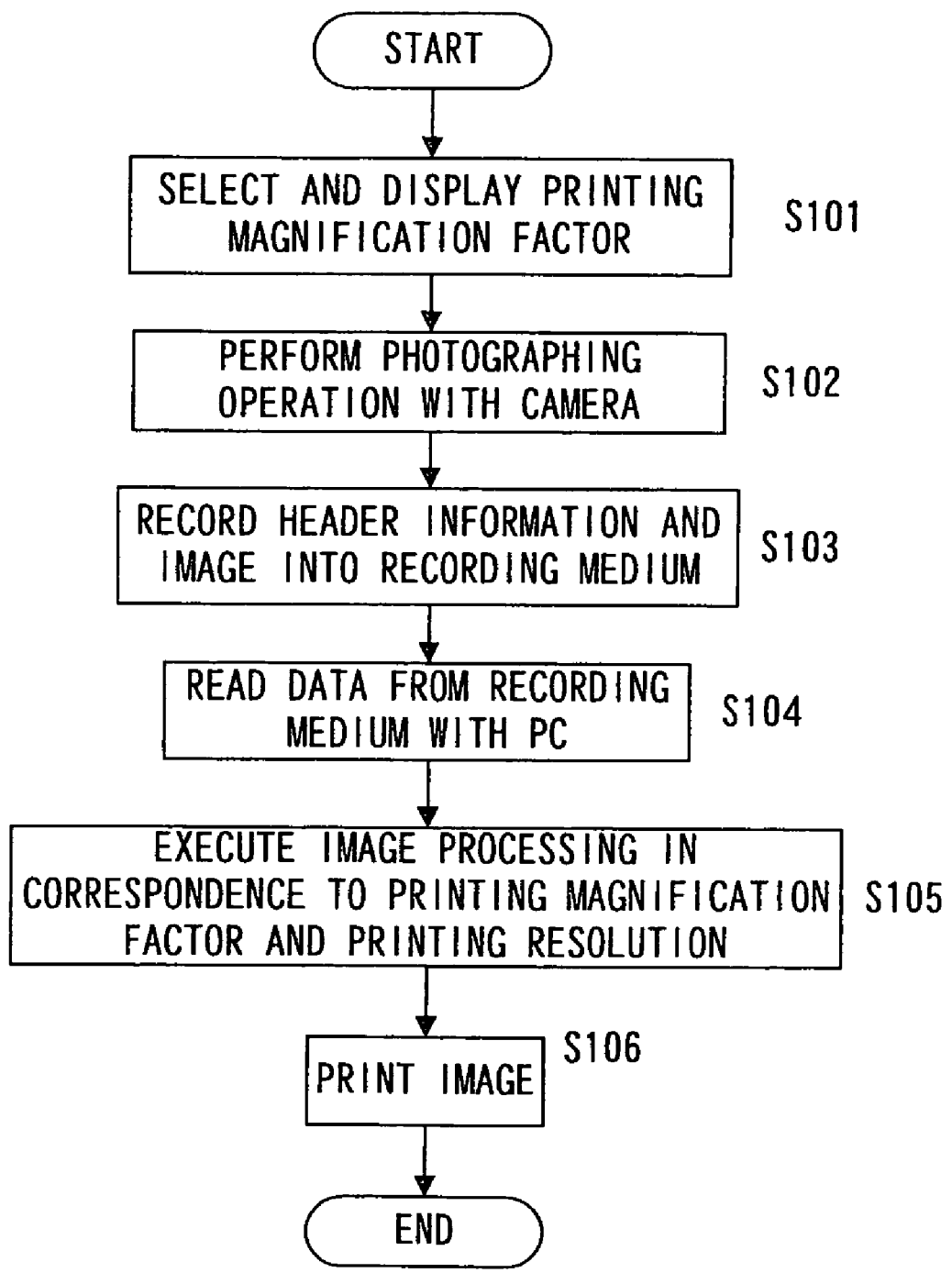
FIG. 4 shows the procedures taken to execute the photographing through printing operations in the camera system shown in FIG. 3.

FIG. 4 presents a schematic flowchart of the procedures of the operations from photographing through printing executed in the camera system shown in FIG. 3. In FIG. 4, the processing from step S101 through step S103 is a photographing procedure implemented in the camera 1, and the processing from step S104 through step S106 is the printing-related procedure. In step S101, the mode selector button 12 is operated to switch from the standard photographing mode to the specified magnification factor photographing mode. The printing magnification factor M may be displayed on the display LCD 3 or the display panel 7 when the specified magnification factor photographing mode is set. In step S102, a photographing operation is performed in the camera in the specified magnification factor photographing mode. In step S103, header information that includes the printing resolution (to be detailed later) and the image data are recorded into the memory card 424.

In step S104, the header information and the image data in the camera 1 are read into the personal computer 20 by, for instance, first removing the memory card 424 from the camera 1 and then installing the memory card 424 into the personal computer 20 in FIG. 3. In step S105, image processing is performed in conformance to the printing resolution included in the header information. In step S106, the image is printed at the magnification factor M by the printer 23.

It is assumed with regard to the printing size mentioned above that all the printing sizes stored in the ROM 443 are in a selected state at the initial stage. The photographer is allowed to set the desired printing size in a selected state as necessary. The following explanation is given on the assumption that the standard paper sizes, i.e., A4, B4, A5 and B6 sizes, are stored in advance in the ROM 443 at the printing sizes and that all the sizes are currently in a selected state.

Figure 5:
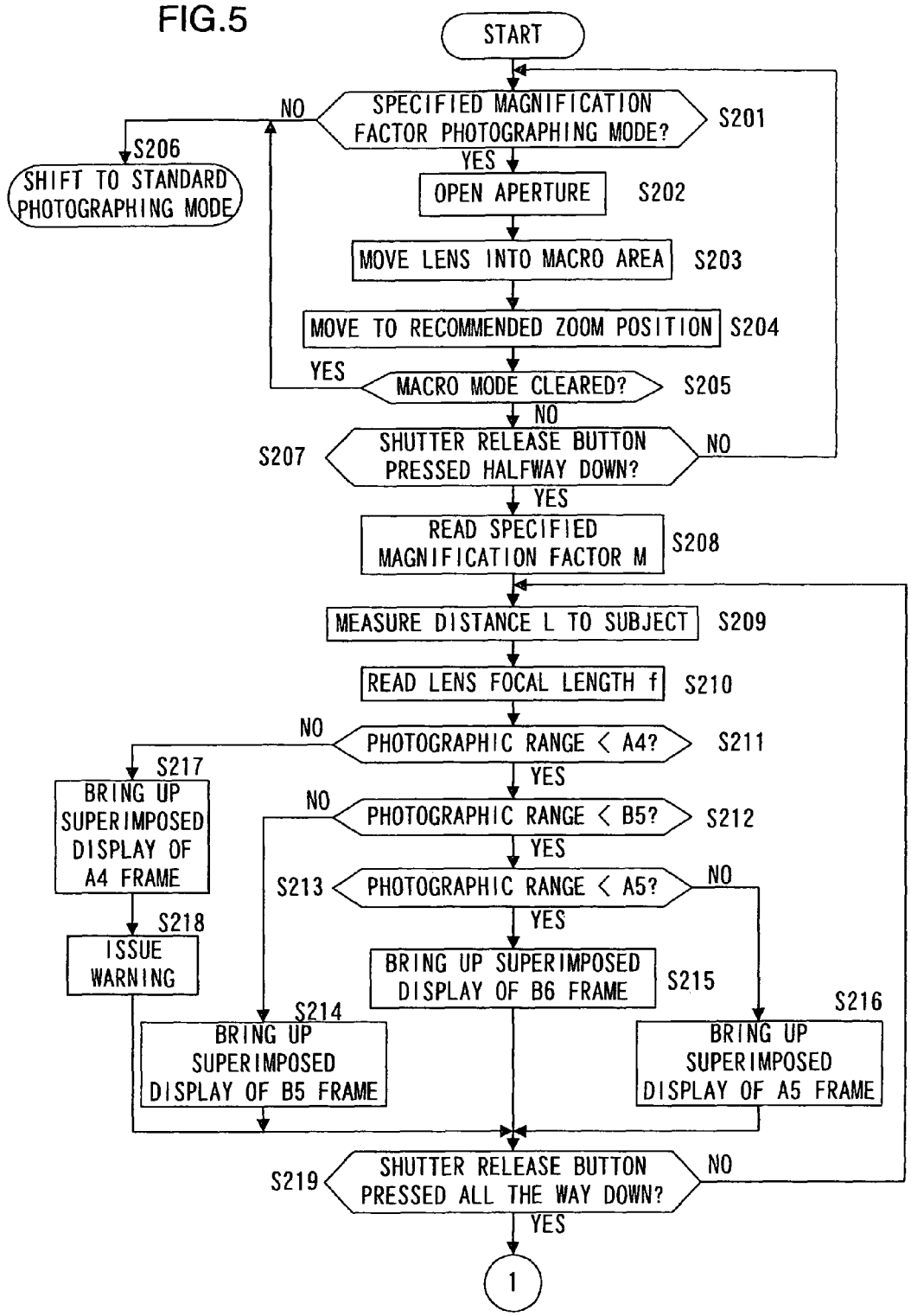
FIG. 5 presents a detailed flowchart of the procedure corresponding to steps S101 through S103 in FIG. 4.
Figure 6:
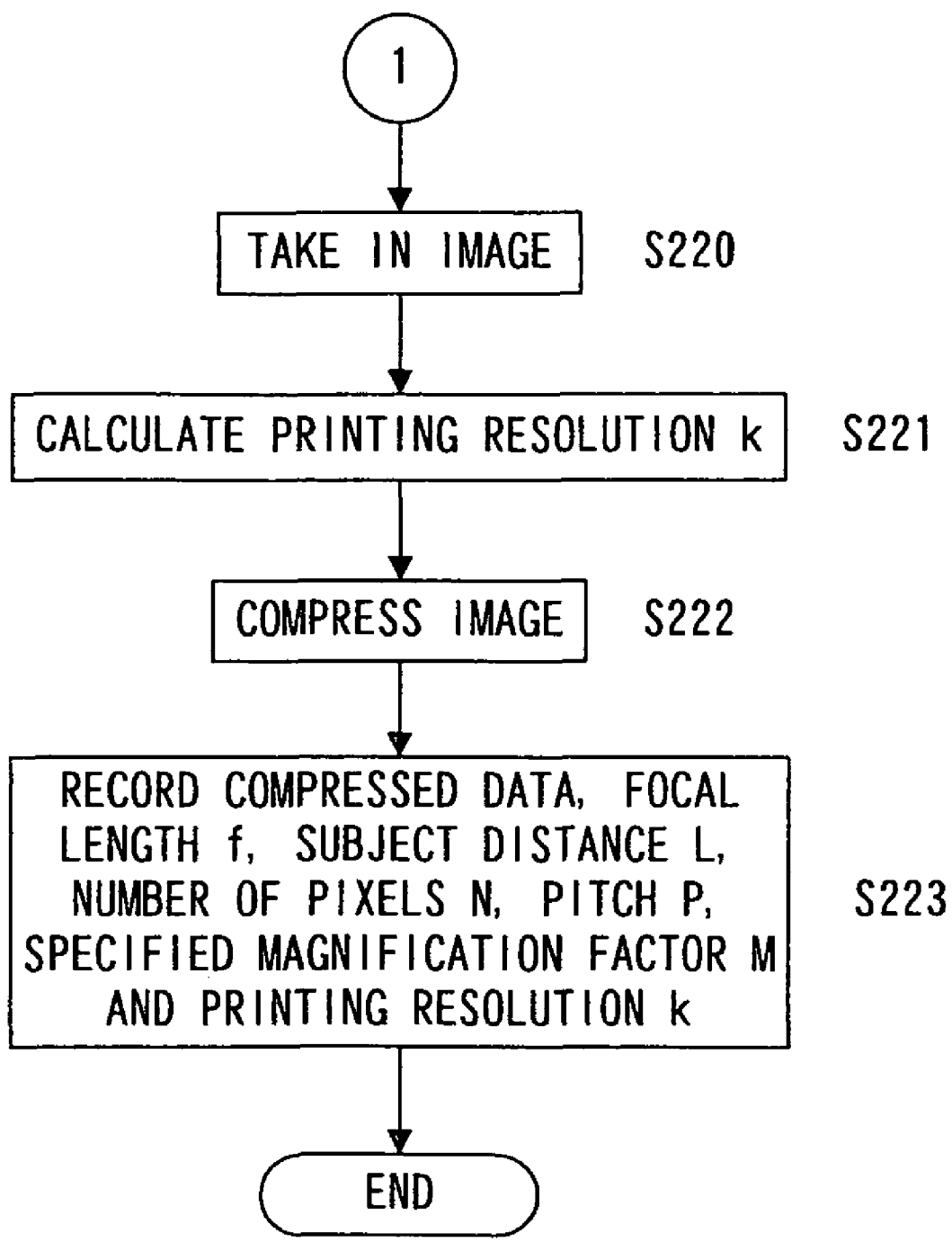
FIG. 6 presents a flowchart of the processing procedure continuing from the procedure in FIG. 5.

Next, the procedure of the processing from step S101 through step S103 in FIG. 4 executed at the camera is explained in further detail in reference to the flowchart presented in FIGS. 5 and 6. FIGS. 5 and 6 present a flowchart of the processing procedure of a program executed by the CPU 439 of the camera 1. In step S201, a decision is made as to whether or not the mode selector button 12 has been operated to switch to the specified magnification factor photographing mode. If it is decided in step S201 that the specified magnification factor photographing mode has been selected, the operation proceeds to step S202. If, on the other hand, it is decided in step S201 that the specified magnification factor photographing mode has not been selected, i.e., if it is decided that the standard photographing mode is currently set, the operation proceeds to step S206 to execute a sequence of processing in the standard photographing mode.

In step S202, the depth of field is reduced by opening the aperture so as to measure the subject distance with a higher degree of accuracy. In step S203, the photographic optical system 2 is adjusted into a macro state. Since the subject image is printed at a magnification factor of 1 or in an enlargement in the specified magnification factor photographing mode, the photographing operation is normally performed with the camera set in close range to the subject. For this reason, control is implemented to automatically set a macro range in step S203. In step S204, the position of the photographic optical system 2 is adjusted so as to set it at a predetermined recommended zoom position. To set the photographic optical system 2 at a recommended zoom position, the lenses should be moved to, for instance, a position halfway between the telephoto end and the wide-angle end so as to minimize the lens aberration.

In step S205, a decision is made as to whether or not the macro mode has been cleared. If it is decided that the macro mode has not been cleared, the operation proceeds to step S207, whereas if it is decided that the focus mode button 13 has been operated to clear the macro mode, the operation proceeds to step S206 to execute the standard photographing mode processing. In step S207, a decision is made as to whether or not the shutter release button 5 has been pressed halfway down, and the operation proceeds to step S208 if it is decided that the shutter release button 5 has been pressed halfway down, whereas the operation returns to step S201 if it is decided that the shutter release button 5 has not been pressed halfway down.

In step S208, the selected printing magnification factor is read from the ROM 443. In step S209, the focal adjustment operation is executed for the photographic optical system 2 by the lens drive circuit 430, and once the current distance to the subject is calculated, the operation proceeds to step S210 to read the focal length.

Figure 7:
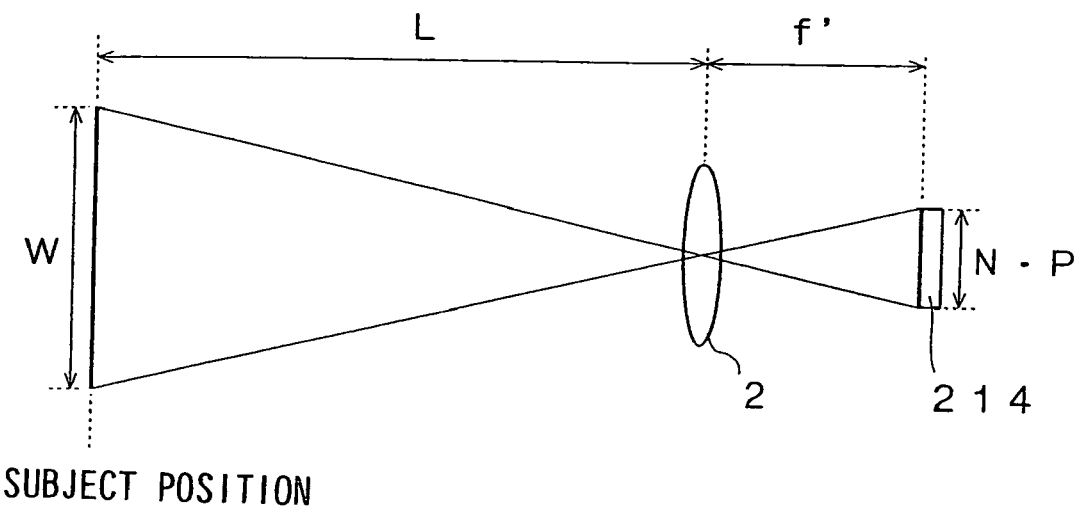
FIG. 7 illustrates the relationship between the subject and the CCD 214.

FIG. 7 shows the relationship between the subject and the CCD 214. A subject image inside a photographic range W is projected over the entire image-capturing area at the CCD 214. It is to be noted that the code W representing the photographic range in FIG. 7 indicates the dimensions of the long side of the photographic range at the subject position, i.e., the lateral measurement of the photographic range when the camera 1 in FIG. 1 is held in a normal position, with N in FIG. 7 indicating the number of pixels provided at the CCD 214 along the widthwise direction in the image-capturing area. In addition, P indicates the pixel pitch at the CCD 214. The relationship expressed as in expression (1) below is achieved at all times among the focal length f, the distance f' between the photographic optical system 2 and the image-capturing surface and the subject distance L.

$$1/L + 1/f' = 1/f$$

$$f' = L \cdot f/(L-f) \tag{1}$$

Figure 8:
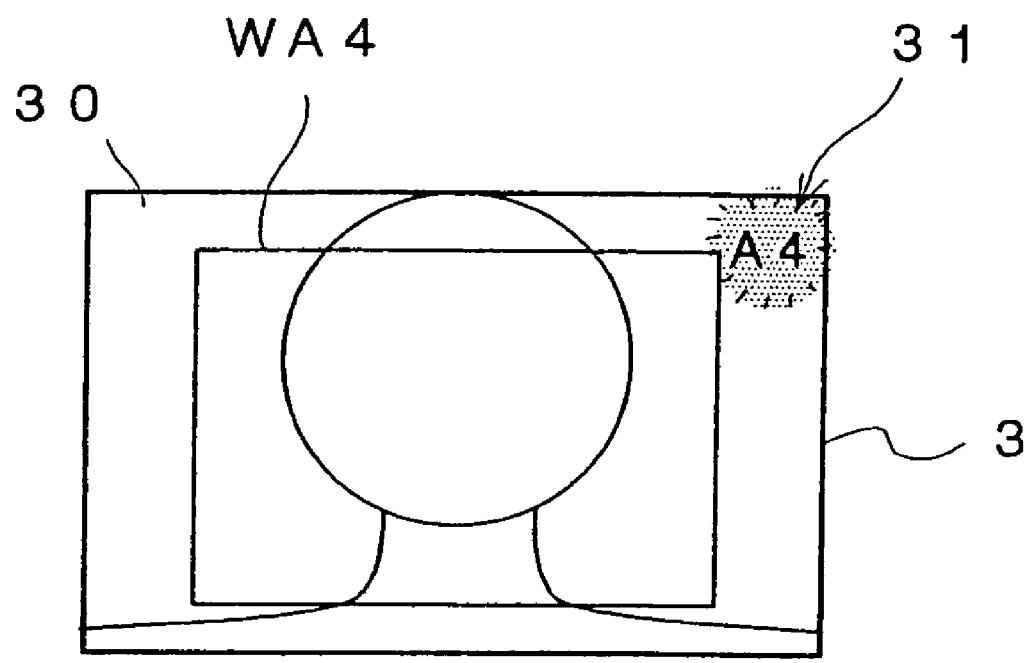
FIG. 8 shows the rectangular frame WA4 brought up on the display LCD 3.

A decision is made in step S211 in FIG. 5 as to whether or not the subject image over the photographic range W shown in FIG. 7 can be printed on an A4-size sheet at the selected printing magnification factor M. If an affirmative decision (YES) is made in step S211, the operation proceeds to step S212, whereas if a negative decision (NO) is made, the operation proceeds to step S217. If a negative decision (NO) is made in step S211 and the operation proceeds to step S217 as a result, a rectangular frame WA4 indicating the maximum range that can be printed on an A4-size sheet at the printing magnification factor M is displayed over the subject image 30 on the display LCD 3 as shown in FIG. 8.

In the following step S218, a warning is issued to notify that the photographic range W cannot be printed on an A4-size sheet. This warning may be issued by flashing an "A4" mark 31 indicating the printing size on the display LCD 3 as shown in FIG. 8 or it may be provided as a voice message by mounting a speaker at the electronic camera. The rectangular frame WA4 on display makes it possible to roughly ascertain how much closer to the subject the camera needs to be moved to allow the subject image to be printed on an A4-size sheet.

If the operation proceeds from step S211 to step S212, a decision is made in step S212 as to whether or not the subject image over the photographic range W can be printed on a B5-size sheet at the printing magnification factor M. If a negative decision (NO) is made in step S212, the operation proceeds to step S214, whereas if an affirmative decision (YES) is made, the operation proceeds to step S213. In step S214, a rectangular frame corresponding to B5 size is brought up on display together with the subject image at the display LCD 3. At this time, the subject image over the photographic range W which is equal to or smaller than A4 size and larger than B5 size is displayed on the display LCD 3.

If, on the other hand, the operation proceeds from step S212 to step S213, a decision is made in step S213 as to whether or not the subject image over the photographic range W can be printed on an A5-size sheet at the printing magnification factor M. If an affirmative decision (YES) is made in step S213, the operation proceeds to step S215 to display a rectangular frame corresponding to B6 size together with the subject image at the display LCD 3. At this time, the subject image over the photographic range W which is equal to or smaller than A5-size is displayed on the display LCD 3.

If, on the other hand, a negative decision (NO) in step S213, the operation proceeds to step S216 to display a rectangular frame corresponding to A5-size together with the subject image at the display LCD 3. At this time, the subject image over the photographic range W which is equal to or smaller than B5 size and larger than A5-size is displayed on the display LCD 3. In step S219, a decision is made as to whether or not the shutter release button 5 has been pressed all the way down, and if it is decided that the shutter release button 5 has been pressed all the way down, the operation proceeds to step S220 in FIG. 6. Otherwise, the operation returns to step S209.

It is to be noted that a zooming operation may be performed either automatically or manually so as to roughly match the photographic range W to the rectangular frame WA4 on display before pressing the shutter release button 5 all the way down. An automatic zooming operation may be performed after, for instance, the subject distance L has been sustained at a constant value over a predetermined length of time or longer. If the subject distance L changes after the zooming operation, the photographic optical system 2 is reset to the recommended zoom position.

Figure 9A:
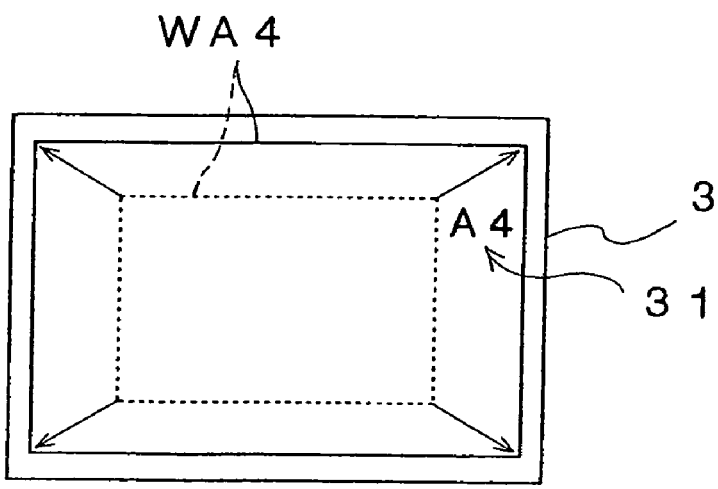
FIGS. 9A~9C show rectangular frames brought up on the display LCD 3, with FIG. 9A illustrating the change occurring in the rectangular frame WA4, FIG. 9B showing the rectangular frame WB5 and FIG. 9C showing the rectangular frames WA5 and WB5.
Figure 9B:
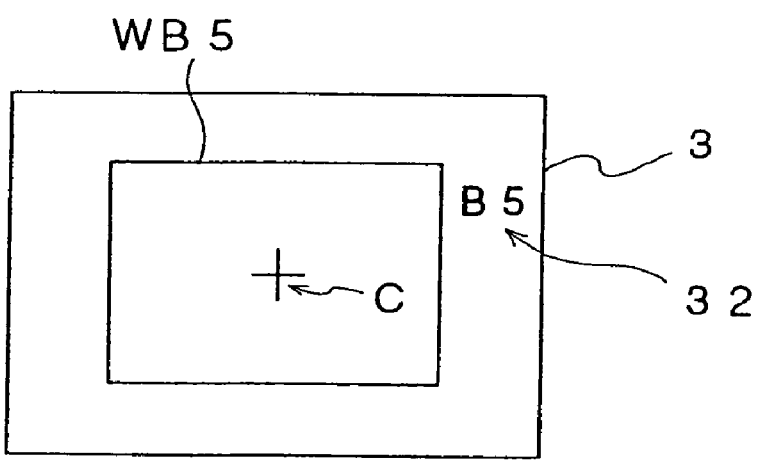

If it is decided in step S219 that the shutter release button 5 has not been pressed all the way down, the processing in steps S209 through S 219 is executed repeatedly. In this case, the photographic range W changes if the photographer moves closer to or further away from the subject, and in response, the size of the rectangular frame WA4 displayed on the display LCD 3, too, changes continuously. For instance, if the photographer moves closer to the subject from the distance shown in FIG. 8, the rectangular frame WA4 indicating A4 size becomes larger, as shown in FIG. 9A. If the photographer moves even closer to the subject and the range achieved by enlarging the photographic range W by the factor M becomes smaller than the printing size, i.e., A4 size, the operation sequentially proceeds to step S212 and step S214 from step S211 in FIG. 5. At this time, a rectangular frame WB5 indicating B5 size and a mark 32 indicating that the rectangular frame WB5 matches B5 size are brought up on display at the display LCD 3 as shown in FIG. 9B.

Figure 9C:
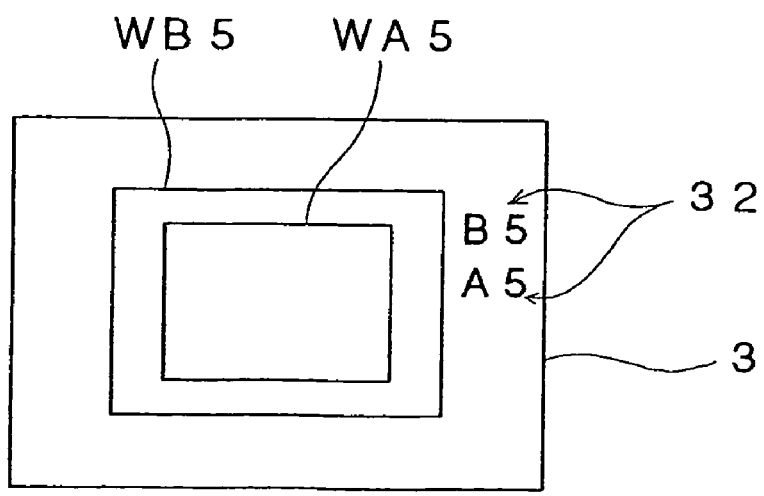

It is to be noted that in steps S214, S215, S216 and S217 in FIG. 5, the largest printing size that can be contained in the range achieved by enlarging the photographic range W by the factor M is displayed on the display LCD 3. For instance, since the range achieved by enlarging the photographic range W by the factor M is larger than B5 size and equal to or smaller than A4 size, the largest rectangular WB5 matching B5 size (see FIG. 9B) among the B5-size rectangular frame, the A5-size rectangular frame and the B6-size rectangular frame that can be displayed is displayed in step S214 in the embodiment. However, instead of displaying the largest rectangular frame alone, the two largest rectangular frames WB5 and WA5 may be displayed as shown in FIG. 9C. In such a case, "B5" and "A5" marks 32 indicating the sizes of the rectangular frames WB5 and WA5 are brought up on display. In addition, a center mark C indicating the center of the display LCD 3 may be displayed as shown in FIG. 9B to facilitate positioning of the subject at the center of the rectangular frame WB5.

In step S220 in FIG. 6, the image captured at the CCD 214 is taken in. In step S221, a printing resolution k, which will allow the subject image over the photographic range W to be printed at the magnification factor M, is calculated. The printing range W shown in FIG. 7 can be expressed as in expression (2) below using the number of pixels N, the pitch P, the subject distance L and the distance f' calculated through the formula in expression (1). Since N pixels correspond to an area ranging over the dimensions M·W when the subject over the photographic range W is to be printed at the printing magnification factor M, the printing resolution k may be set as expressed in expression (3) below. A modification of expression (3), obtained by using expression (2), is expressed in expression (4) below.

$$W = N \cdot P \cdot L/f' \tag{2}$$

$$k = N/(M \cdot W) \tag{3}$$

$$= f'/(P \cdot L \cdot M) \tag{4}$$

The errors attributable to the lenses constituting the photographic optical system 2 should be taken into consideration in reality, and thus, the printing resolution k can be expressed as in expression (5) below by using an error coefficient α.

$$k = \alpha \cdot f'/(P \cdot L \cdot M) \tag{5}$$

The image data are compressed in a specific format in step S222 in FIG. 6. In step S223, the focal length f, the subject distance L, the number of pixels N, the pixel pitch P, the specified printing magnification factor M, the printing resolution k and the like are recorded as tag information together with the compressed image data into the memory card 424. Thus, the sequence of processing from photographing through recording executed at the electronic camera 1 ends. The image data corresponding to the entire image captured by the CCD 214 may be recorded in the memory card 424, or only the image data over the range enclosed by the largest rectangular frame among the rectangular frames corresponding to the printing sizes displayed on the display LCD 3 may be clipped out and stored in the memory card 424.

It is to be noted that if the printing resolution k is to be recorded in the TIFF format, the printing resolution k is recorded in units corresponding to the resolution along the width of the image, the resolution along the height of the image and the resolution along the width and the height of the image respectively defined by tag numbers 282~284. If, on the other hand, the printing resolution k is recorded in the Exif format, individual pieces of information indicating the subject distance, the lens focal length, the resolution along the height of the focal plane, the resolution along the width of the focal plane and the resolution over the focal plane as defined by tag numbers 37386, 37382, 41486~41488 are recorded. Since a free area, which allows the user to write data freely, is provided in such a case, the printing magnification factor M may be written into the free area to enable the printer to read the data to calculate the printing resolution k with the application software program.

In addition, if a type of camera that records data in another file format in the standard photographing mode is used, the format may be switched to the TIFF format or the Exif format when the specified magnification factor photographing mode is selected.

When printing the subject image, the image data are taken into the personal computer 20 shown in FIG. 3 as described above and the image is printed on the printer 23 connected to the personal computer 20. During this process, the printer 23 reads the printing resolution k recorded as tag information and sets the printing resolution k as the resolution at which the image is to be printed. Namely, through a printing operation performed at the printing resolution k, the printed subject image is magnified by a factor M as desired. It is to be noted that if the application software program in use does not automatically read and set the printing resolution k, the user must check the tag information and manually set the printing resolution k.

(Variation 1)

Figure 10A:
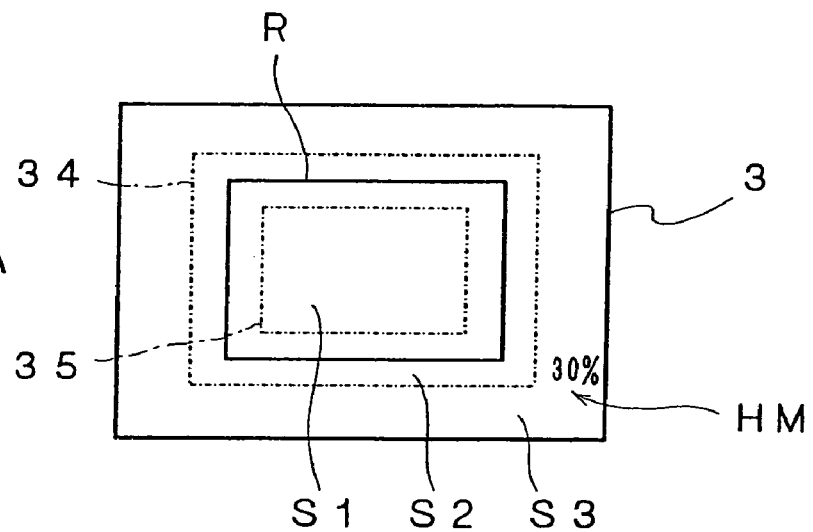

In the embodiment described above, the size of the rectangular frame WA4 displayed on the display LCD 3 continuously changes as shown in FIG. 9A as the photographer changes the subject distance L. In the first example of variation explained below, a rectangular frame R with a fixed size is displayed as shown in FIG. 10A. First, the display area of the display LCD 3 is divided into three areas S1, S2 and S3. The area S1 ranges on the inside of a rectangular border 35. The area S2 is enclosed by a rectangular border 34 and the border 35. The area S3 is enclosed by the display frame of the display LCD 3 and the border 34. The rectangular frame R on display is set roughly halfway between the border 34 and the border 35.

Figure 10B:
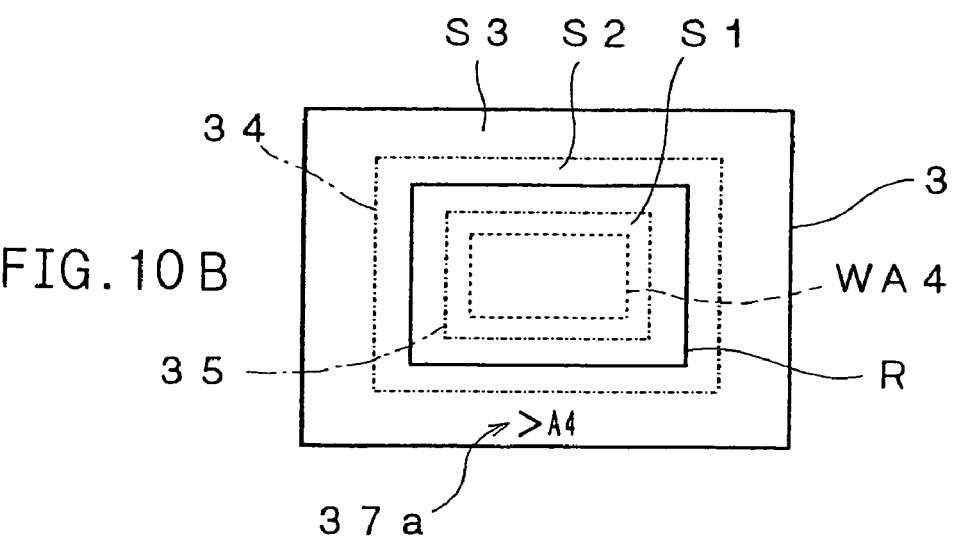

As shown in FIG. 10B, if the rectangular frame WA4 mentioned earlier is contained within the area S1, the rectangular frame R and a ">A4" mark 37a are brought up on display. This display enables the photographer to verify that the range indicated by the rectangular frame R is larger than A4 size. It is to be noted that while the rectangular frame WA4 is shown on the display LCD 3 to in FIG. 10B facilitate the explanation, the rectangular frame WA4 is not displayed in reality.

Figure 11A:
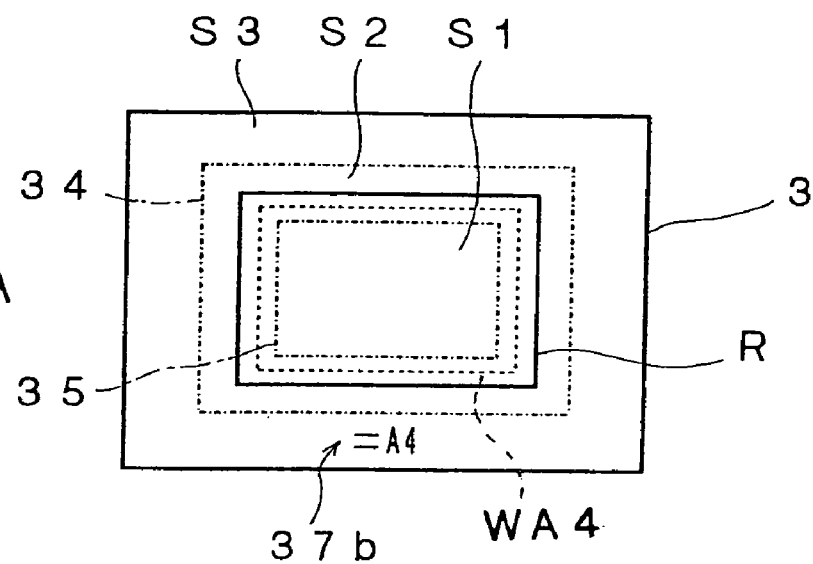
FIG. 11A illustrates the rectangular frame R in the display that includes the mark 37b and FIG. 11B shows the display that includes the mark 37c.
Figure 11B:
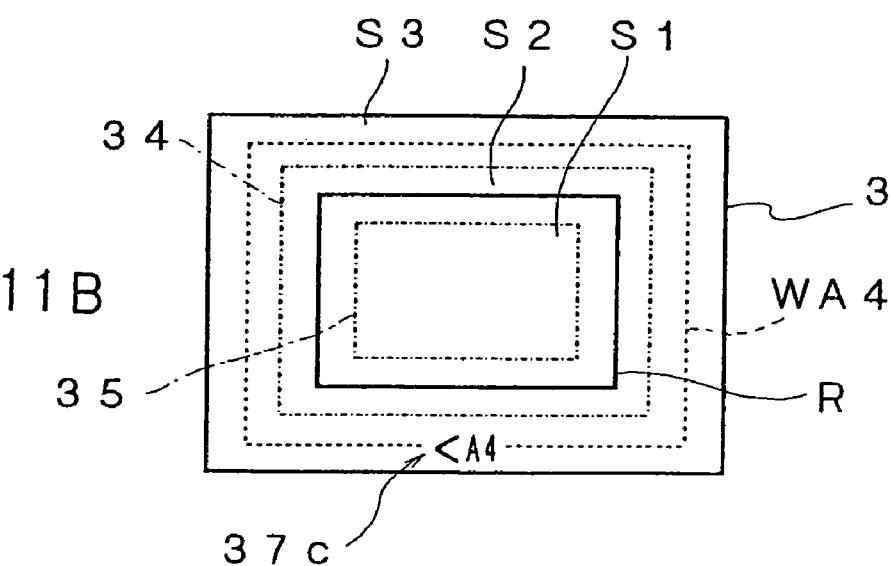

If the subject distance changes so that the rectangular frame WA4 is now contained inside the area S2, as shown in FIG. 11A, the rectangular frame R and a "=A4" mark 37b are brought up on display, since the range indicated by the rectangular frame R is roughly equal to A4 size. If the rectangular frame WA4 is contained within the area S3 as shown in FIG. 11B, the rectangular frame R and a "<A4" mark 37c are brought up on display since the range indicated by the rectangular frame R is smaller than A4 size.

If the photographic range W is further reduced and the operation proceeds from step S212 to step S214 accordingly, a ">B5" mark corresponding to B5 size is brought out on display in place of the mark 37a shown in FIG. 10B. As described above, the rectangular frame R with a fixed size is displayed even as the photographic range W changes and by displaying one of the marks 37a~37c to indicate the size of the rectangular frame R relative to the printing size, an approximate size of the range indicated by the rectangular frame R relative to the printing size can be ascertained. In particular, since the size of the rectangular frame R remains unchanged, the display control can be greatly simplified compared to the control implemented when the size of the rectangular frame continuously changes.

In addition, the display magnification factor HM representing the ratio of the size of the subject image displayed on the display LCD 3 and the actual size of the image may be displayed on the display LCD 3 as shown in FIG. 10A. With Lw representing the size of the display screen of the display LCD 3, the display magnification factor HM can be calculated through expression (6) below by using expression (3).

$$HM = Lw/M \cdot W \qquad (6)$$
$$= Lw/(N/k)$$

(Variation 2)

Figure 12A:
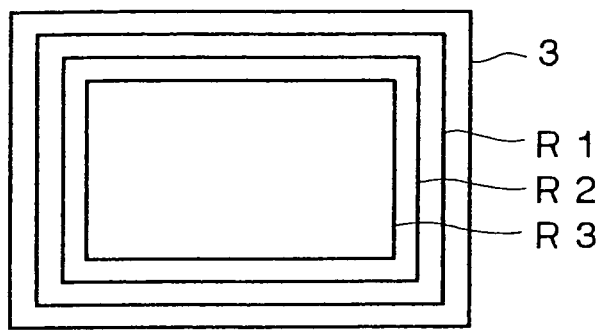
FIGS. 12A~12D illustrate the rectangular frames R1~R3 in variation 2, with FIG. 12A illustrating the relationship among the rectangular frames R1~R3, FIG. 12B showing the rectangular frame R1 on display, FIG. 12C showing the rectangular frame R2 on display and FIG. 12D showing the rectangular frame R3 on display.
Figure 12B:
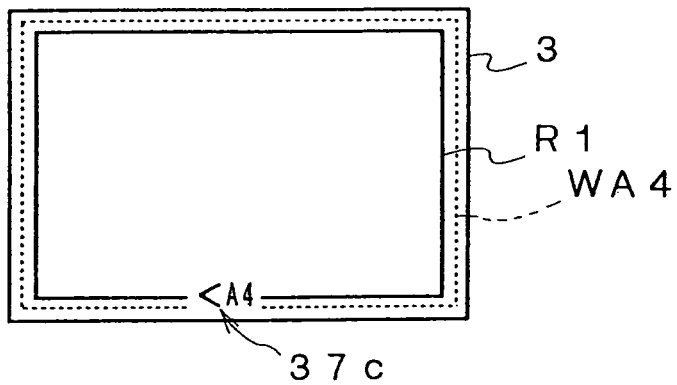

While the size of the rectangular frame R remains constant in variation 1, the size of the rectangular frame R in variation 2 is varied over three levels, i.e., R1, R2 and R3. As shown in FIG. 12A, three rectangular frames R1, R2 and R3 with the varying sizes can be displayed on the display LCD 3. For instance, if the rectangular frame WA4 mentioned earlier corresponds to the photographic range shown in FIG. 12B, the rectangular frame R1, which is the closest in size to the rectangular frame WA4, is brought up on display. As in variation 1, one of the ">A4", "=A4" and "<A4" marks 37a~37c is displayed at this time in conformance to the relationship between the size of the rectangular frame R1 and the size of the rectangular frame WA4.

Figure 12C:
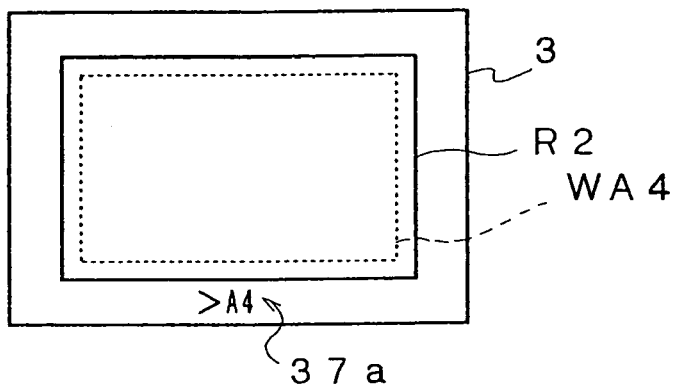
Figure 12D:
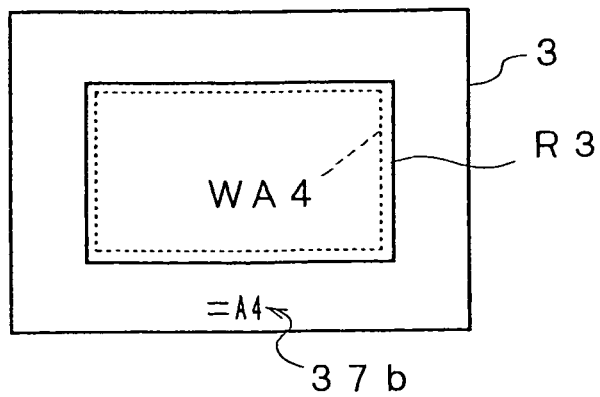

When the distance to the subject increases and the rectangular frame WA4 corresponds to the photographic range shown in FIG. 12C, the rectangular frame R2 is brought up on display. In this case, one of the ">A4", "=A4" and "<A4" marks 37a~37c is displayed in conformance to the relationship between the size of the rectangular frame R2 and the size of the rectangular frame WA4. As the distance to the subject further increases and the rectangular frame WA4 corresponds to the photographic range shown in FIG. 12D, the rectangular frame R3 is brought up on display. In this case, one of the ">A4", "=A4" and "<A4" marks 37a~37c is displayed in conformance to the relationship between the size of the rectangular frame R3 and the rectangular frame WA4. If the operation proceeds from step S212 to step S214 in FIG. 5, the rectangular frames R1~R3 correspond to B5 size, and accordingly, ">B5", "=B5" and "<B5" marks are displayed instead of the marks 37a~37c corresponding to A4 size. Since the rectangular frame is displayed by varying its size over three levels, i.e., R1~R3, in variation 2, the photographic range can be ascertained in finer increments than in variation 1.

(Variation 3)

Figure 13:
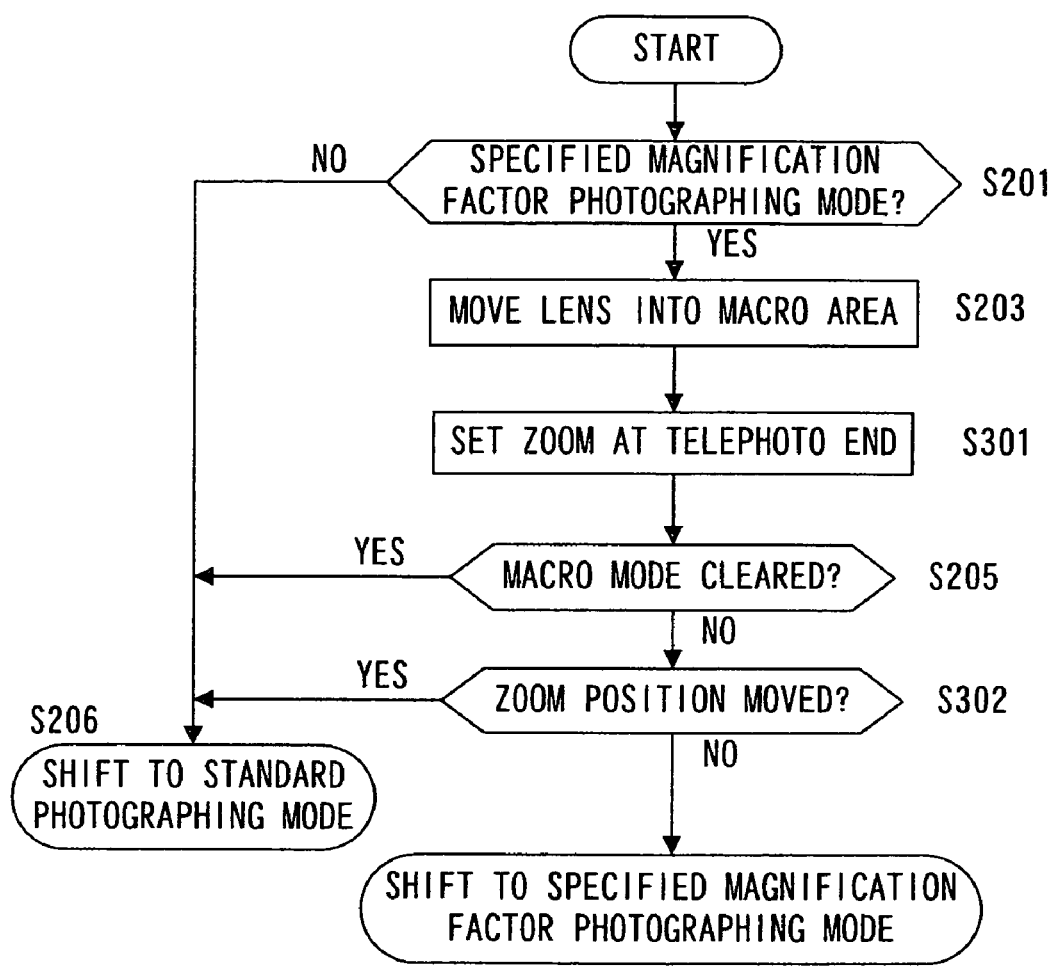
FIG. 13 is provided to facilitate an explanation of variation 3 which is an example of a variation of the procedure in the flowchart in FIG. 5.

FIG. 13 shows a variation of the processing in the flowchart in FIG. 5, which is achieved by eliminating step S202 and adding steps S301 and S302 in the processing shown in FIG. 5. After moving the lens into the micro area in step S203, the zoom position is set at the telephoto end in step S302. By setting the zoom position at the telephoto end in this manner, an advantage is achieved in that the subject distance L can be measured with a higher degree of accuracy. In addition, a decision is made in step S302 as to whether or not the zoom position has been changed and if it has been changed, the processing is executed in the standard photographing mode in step S206, whereas if the zoom position has remained unchanged, the processing in step S207 and subsequent steps in FIG. 5 is executed.

It is to be noted that while the printing resolution k is calculated through expression (4) or (5) in the embodiment explained above, a table of the printing resolutions k relative to variables, i.e., the subject distance L and the focal length f may be stored in advance in the ROM 443 so as to allow the printing resolution k to be extracted from the table in correspondence to a given set of subject distance L and focal length f instead.

In addition, while the printing resolution k is calculated in the electronic camera 1 in FIG. 3, the printing resolution k may be instead calculated in the personal computer 20 or the printer 23 on the printing side based upon the subject distance L, the focal length f, the number of pixels N, the pixel pitch P and the printing magnification factor M recorded as the tag information. It is to be noted that if no printing magnification factor M is recorded as tag data or a printing magnification factor of 0 is recorded as tag data, it is assumed that no specification has been made with regard to the printing magnification factor and, accordingly, the subject image is printed at the magnification factor of 1.

Figure 14A:
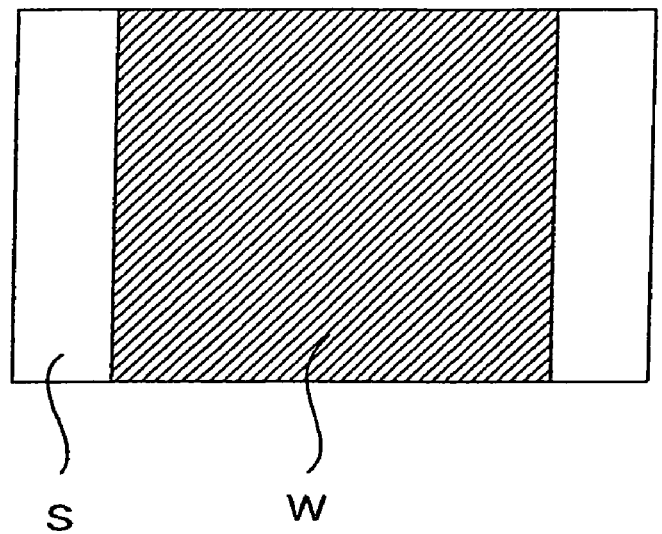
FIGS. 14A and 14B show the relationship between the printing size S and the photographic range W, with FIG. 14A showing the printing size S set laterally longer and FIG. 14B showing the printing size S set longitudinally longer.
Figure 14B:
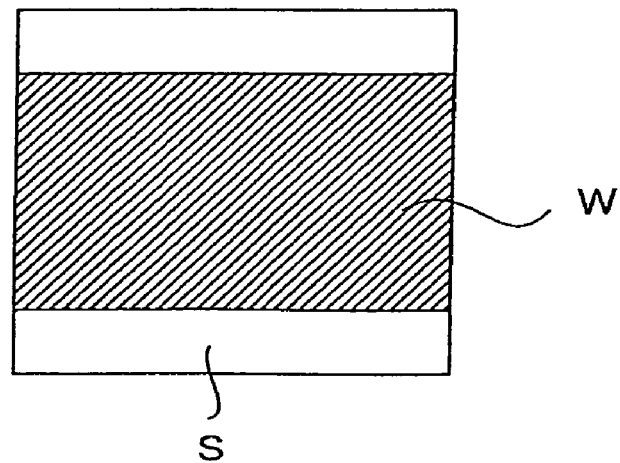

The first embodiment has been explained by assuming that the aspect ratio of the printing size and the aspect ratio at the CCD 214 are equal to each other. However, if the aspect ratios of the photographic range W and the printing size are different, e.g., if the printing size S is laterally elongated compared to the photographic range W as shown in FIG. 14A, the various parameters should be calculated by comparing the longitudinal dimensions of the photographic range W and the printing size S to ensure that the entire image is printed. If, on the other hand, the printing size S is longitudinally elongated compared to the photographic range W as shown in FIG. 14B, the various parameters should be calculated by comparing the lateral dimensions of the photographic range W and the printing size S in a similar manner. This principle applies to the following explanation, as well.

An explanation is given above in reference to the first embodiment on the assumption that the ratio "longitudinal measurement: lateral measurement" with regard to the printing sizes and the ratio "longitudinal measurement:lateral measurement" of the CCD 214 are equal to each other. However, if the aspect ratio of the photographic range W is different from the aspect ratio of the printing size, e.g., if the printing sizes is wider than the photographic range W as shown in FIG. 14A, the sizes of the photographic range W and the printing sizes should be compared against each other through a comparison of their longitudinal measurements. If, on the other hand, the printing sizes has a greater height than the photographic range W as shown in FIG. 14B, the sizes of the photographic range W and the printing sizes should be compared against each other through a comparison of their lateral measurements. This principle applies to the following explanation as well.

Furthermore, if the printing resolution k is above or below a desirable printing resolution range, the resolution may be lowered by sub-sampling or culling the image data or may be raised through interpolation processing (e.g., through bi-cubic interpolation processing). For instance, when a photographic range with its longer side equaling approximately 50 cm is photographed by using the CCD 214 with 2000 pixels provided along the longitudinal direction and an A4-size (with its longer side equaling approximately 30 cm) area of the photographed image is printed at a magnification factor of 1, the printing resolution is lowered to approximately 40 (dots/cm). In such a case, the printing resolution may be raised to 80 (dots/cm) through interpolation processing to reduce the appearance of jaggies. When a photographic range having a longer side of approximately 5 cm is photographed and the photographed image is printed at a magnification factor of 1, on the other hand, the printing resolution increases to an excessively high level of 400 (dots/cm), and in such a case, the image data resolution may be reduced through image data sub-sampling or interpolation processing so as to set the resolution to approximately 150 (dots/cm).

In addition, if a wide converter or a tele-converter is mounted at the front surface of the photographic optical system 2 in the electronic camera, information indicating that such a converter has been mounted is either automatically or manually transmitted to the camera. In this case, the focal length f is corrected. The specified magnification factor photographing mode may be disallowed or the specified magnification factor photographing mode may be cleared in such a situation, as well.

The following features are achieved in the first embodiment explained above.

(a) Since the rectangular frame corresponding to the printing size is displayed on the display LCD 3, a photographing operation can be performed while checking the image to be printed.

(b) By setting the desired printing magnification factor M during the photographing operation, the printing resolution k corresponding to the M-factor printing operation is automatically calculated and thus, a printing operation can be performed at the calculated printing resolution k to print the image at the magnification factor M with ease.

- Second Embodiment-

In the first embodiment explained above, the printing resolution k is calculated by using the expression (4) or the expression (5) which incorporates the error coefficient α. However, since the error coefficient α varies among individual cameras, the errors of various cameras cannot be corrected accurately by using a specific single error coefficient α. Accordingly, a method of correcting the error in each camera by photographing a reference chart with the camera is adopted in the second embodiment. In the following explanation, such a correction mode is referred to as a calibration mode, and the calibration operation to be detailed later is executed by, for instance, operating the dial 6 in FIG. 1 to set the electronic camera in the calibration mode. In the calibration mode, the printing magnification factor M is automatically set to M=1.

Figure 15:
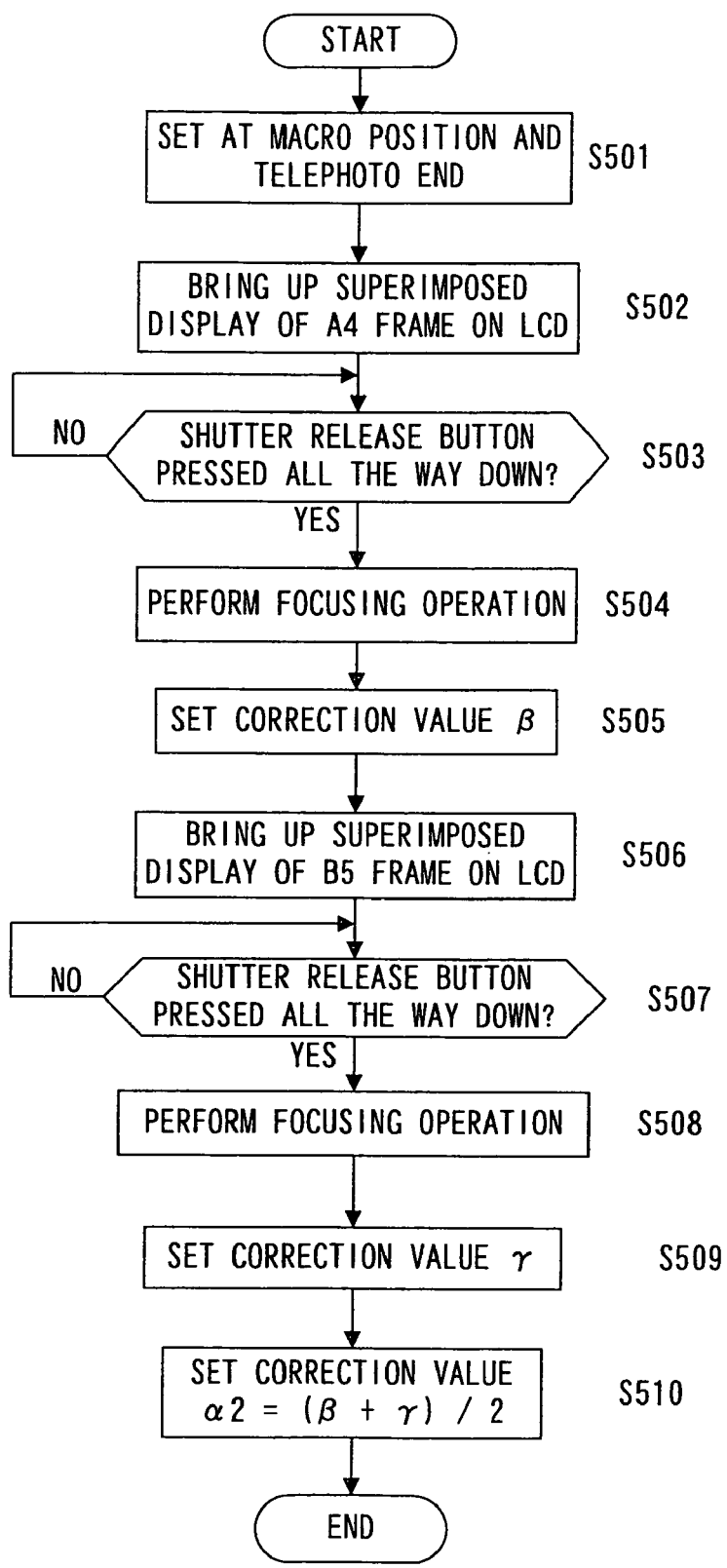
FIG. 15 presents a flowchart provided to facilitate an explanation of the procedure implemented in the calibration mode in a second embodiment.

FIG. 15 presents a flowchart of the procedure implemented to calibrate the lens error. It is to be noted that a reference chart which includes printed frames corresponding to specific printing sizes, e.g., A4 size and B4 size, should be prepared in advance for the calibration operation. Once the calibration mode is set, the processing shown in FIG. 15 starts. In step S501, the position of the photographic optical system 2 is adjusted at the macro position and also at the telephoto end.

Figure 16A:
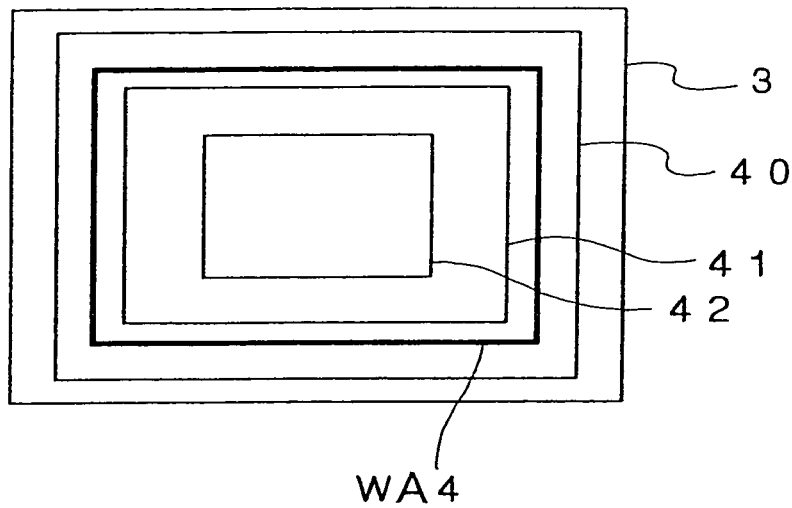
FIGS. 16A and 16B show the relationships between the reference chart and the rectangular frames brought up on the display LCD 3, with FIG. 16A showing the frame 41 and the rectangular frame WA4 and FIG. 16B showing the frame 42 and the rectangular frame WB5.

The photographer holds the electronic camera 1 toward the reference chart with the photographic optical system 2 maintaining the state set in step S501. Since the continuous AF mode for constantly executing the focal adjustment operation is selected in conjunction with the calibration mode, a focal adjustment is performed using the reference chart. In step S502, the rectangular frame WA4 corresponding to A4 size and a reference chart 40 are displayed on the display LCD 3 as shown in FIG. 16A. The reference chart 40 includes a frame 41 indicating A4 size and a frame 42 indicating B5 size, and, accordingly, FIG. 16A shows the frames 41 and 42 and the rectangular frame WA4 brought up on display at the display LCD 3.

If the error coefficient α, which indicates the lens error as explained earlier, is 1, the frame 41 and the rectangular frame WA4 on the display LCD 3 will match. However, since they do not match in FIG. 16A, the error coefficient α≠1. The photographer moves away from the reference chart 40 until the frame 41 matches the rectangular frame WA4 and presses the shutter release button 5 all the way down when the frame 41 becomes matched with the rectangular frame WA4. Once the shutter release button 5 is pressed all the way down, the operation proceeds from step S503 to step S504 in FIG. 15 to execute a focusing operation.

In step S505, a correction value β is calculated based upon the subject distance L2 and the focal length f2 ascertained during the focusing operation executed in step S504. A theoretical printing resolution k1 is determined through the expression (7) without allowing for any lens error. A printing resolution k2 calculated by taking into consideration the error based upon the focal length f2 and the subject distance L2 obtained through the focusing operation, on the other hand, is expressed as in the expression (8) below, assuming that f2'=L2·f2/(L2−f2). The correction value β, which is represented as the ratio of k1 and k2, can be calculated through the expression (9) below. In this embodiment, it is assumed that M=1 and that S matches the A4 size.

$$k1 = N/(\text{printing size } S) \tag{7}$$

$$k2 = f2'/(P \cdot L2 \cdot M) \tag{8}$$

$$\beta = k1/k2 = P \cdot L2 \cdot M/(f2' \cdot S) \tag{9}$$

Figure 16B:
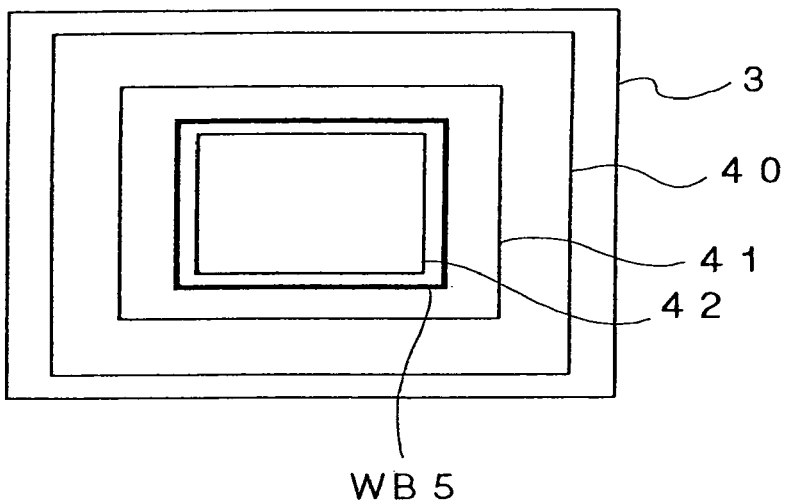

Next, the rectangular frame WB5 corresponding to B5 size and the reference chart 40 are brought up on display at the display LCD 3 as shown in FIG. 16B in step S506. The photographer moves further away from the reference chart 40 until the frame 42 matches the rectangular frame WB5, and when the frame 42 is matched with the rectangular frame WB5, the shutter release button 5 is pressed all the way down. Once the shutter release button 5 is pressed all the way down, the operation proceeds from step S507 to step S508 in FIG. 15 to execute a focusing operation. A printing resolution k3 set at this time is calculated through the expression (10) below by using the focal length f3 and the subject distance L3 obtained through the focusing operation executed in step S508. It is assumed that f3'=L3·f3/(L3−f3). In step S509, a correction value γ which represents the ratio of k1 and k3 is calculated. The correction value γ is expressed as the expression (11) below. In step S510, an average α2 of the correction value β and the correction value γ is calculated through the expression (12) and this average α2 is set as the correction coefficient in the second embodiment.

$$k3 = f3'/(P \cdot L3 \cdot M) \tag{10}$$

$$\gamma = k1/k3 = P \cdot L3 \cdot M/(f3' \cdot S) \tag{11}$$

$$\alpha 2 = (\beta + \gamma)/2 \tag{12}$$

Since the correction coefficient α2 is set for each electronic camera in the second embodiment, the lens error and the like can be corrected even more accurately than in the first embodiment in which the correction is performed by using a specific correction coefficient α.

- Third Embodiment-

The third embodiment is now explained. The external appearance of the electronic camera achieved in the third embodiment and its circuit block diagram are identical to those of the electronic camera 1 in the first embodiment. Accordingly, FIGS. 1A, 1B and 2 should be referred to for their details, and their explanation is omitted. The electronic camera 1 in the third embodiment may be set in a specified size photographing mode in which the subject is photographed by fixing the size of the photographic range at the subject position to a selected printing size or a standard photographing mode which is equivalent to the recording mode in an electronic camera in the related art. Either mode is selected through the mode selector button 12.

The operation executed in the electronic camera 1 in the third embodiment is explained. In the electronic camera 1, the recording mode or the reproduction mode can be selected through the command dial 6. The recording mode includes the standard photographing mode equivalent to the recording mode in an electronic camera in the related art and the specified size photographing mode in which an automatic zoom adjustment is executed to match the photographic range at the subject position with the printing size that has been set.

(Standard Photographing Mode)

Since the operation performed in the standard photographing mode is similar to that executed in an electronic camera in the related art and is also similar to that executed in the first embodiment, its explanation is omitted.

It is to be noted that the electronic camera 1 in the embodiment has an electronic zoom function whereby an image can be electronically enlarged through interpolation processing implemented on image data in conformance to a magnification factor setting Y. The DSP 433 sets the electronic zoom magnification factor Y in response to a command issued by the CPU 439 and the image data undergo interpolation processing executed in conformance to the magnification factor setting Y. A zoom signal generated by operating the zoom switching button 9, and a halfway-press operation signal or a full-press operation signal resulting from an operation of the shutter release button 5 are input to the CPU 439.

If the zoom switching button 9 is operated toward the telephoto side (T), the CPU 439 drives the lens drive circuit 430 to optically raise the zoom magnification factor. In addition, if the zoom switching button 9 is continuously operated toward the telephoto side (T) even after the optical magnification factor reaches a predetermined maximum value, the electronic zoom magnification factor Y is determined in correspondence to the extent to which the zoom switching button 9 is operated. When the electronic zoom magnification factor is Y, the image data in the area ranging over 1/Y both along the vertical direction and along the horizontal direction around the center of the subject image are extracted. The DSP 433 implements a specific type of image processing on the extracted image data and also executes interpolation processing on the brightness signals and the color difference signals calculated through the image processing to interpolate them by a magnification factor of Y along the vertical and horizontal directions.

(Reproduction Mode)

If the reproduction mode is selected through the command dial 6, image data recorded in the memory card 424 are read and stored into the buffer memory 436. Under normal circumstances, the image data most recently recorded into the memory card 424 or the image data recorded into the memory card 424 the earliest are read. The image data stored in the buffer memory 436 are read out by the CPU 439, processed by the DSP 433 so that they can be used as display image data and then the processed image data are displayed as a reproduced image at the display LCD 3. It is to be noted that if no image data have been recorded in the memory card 424, a message indicating that there are no image data is displayed at the display LCD 3.

If the selector button 11a or 11c in FIG. 1 is operated while a reproduced image is displayed at the display LCD 3, the image data in the preceding frame are read out from the memory card 424 and the reproduced image of the image data is displayed at the display LCD 3. If, on the other hand, the selector button 11b or 11d is operated, the image data in the succeeding frame are read and the reproduced image of the image data are brought up on the display LCD 3. Thus, in the reproduction mode, a reproduced image is displayed at the display LCD 3 but the subject image captured by the CCD 214 cannot be displayed as in the photographing mode. In addition, no focal adjustment operation or exposure detection for photographing purposes is executed in the reproduction mode.

(Specified Size Photographing Mode)

Next, the specified size photographing mode is explained. As explained above, a zoom adjustment is executed in the specified size photographing mode so as to match the photographic range with the printing size which has been set. In the following explanation, S and W are used to respectively refer to the printing size and the photographic range. In the electronic camera 1 in the embodiment, the desirable size can be specified from a plurality of printing sizes S set in advance. The desirable size is selected by using the menu button 10 and the selector buttons 11a~11d explained earlier. More specifically, a printing size setting menu is brought up on display at the display LCD 3 through the menu button 10. Symbols each representing one of the various sizes are displayed in the printing size setting menu, and by selecting one of them with the selector buttons 11a~11d, the photographic range W is set to the selected size S.

For instance, let us assume that the printing size S is set at A4 size. If the shutter release button 5 is pressed half-way down in this situation, the photographic optical system 2 is driven so as to project an A4 size range in the subject over the entire image-capturing surface of the CCD 214. As a result, the image over the A4 size photographic range is displayed over the entire display LCD 3.

Since the camera system used to execute operations for photographing the subject through printing the image at the magnification factor 1 is identical to that shown in FIG. 3, in reference to which the first embodiment has been explained, its explanation is omitted.

Figure 17:
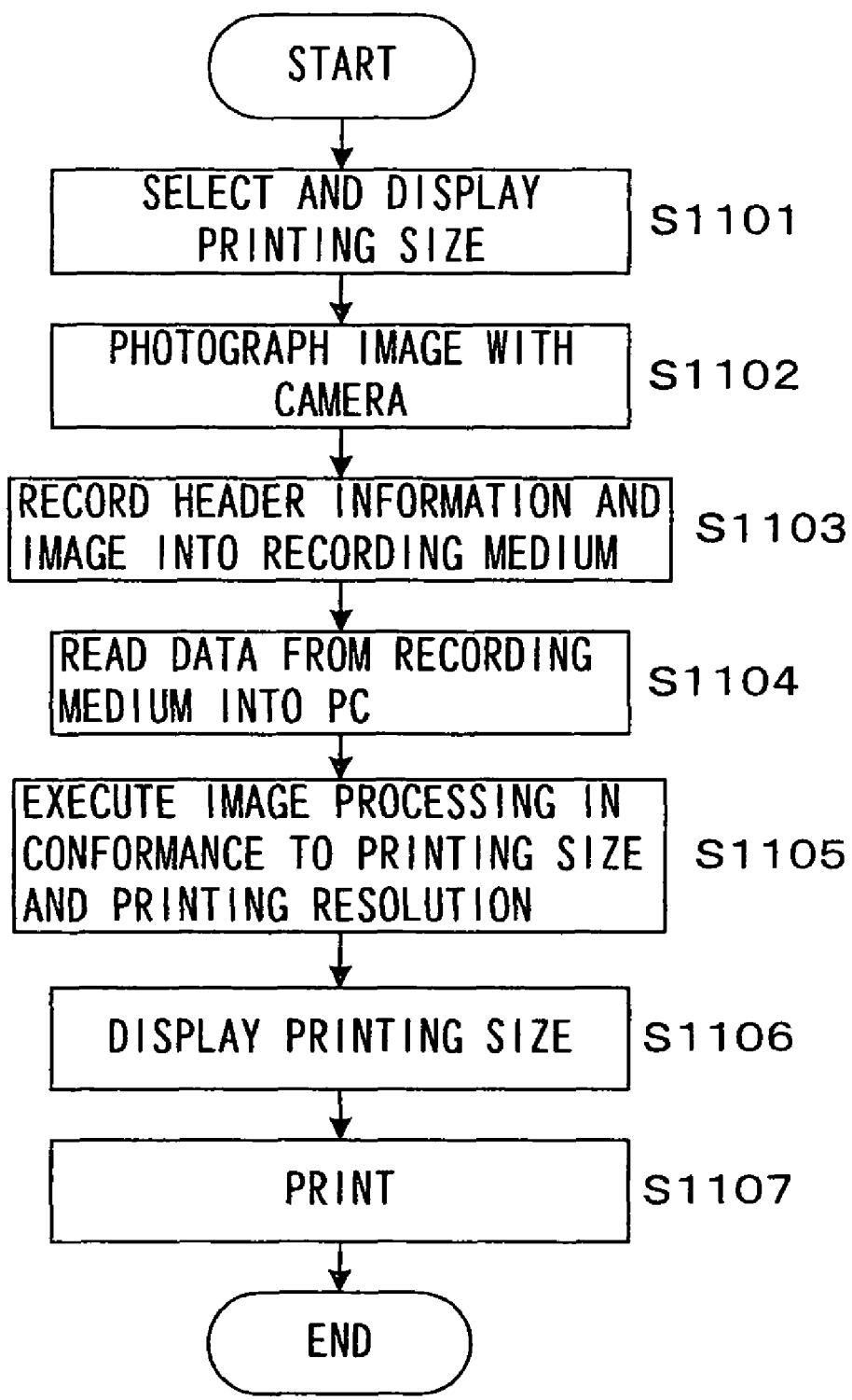
FIG. 17 shows the procedure of the operations from photographing through printing, executed in the camera system in a third embodiment.

FIG. 17 presents a schematic flowchart of the procedure of the operations, from photographing through printing, executed in the camera system shown in FIG. 3. In FIG. 17, the photographing processing is executed in steps S1101 through S1103 at the camera 1, and the printing processing is executed in steps S1104 through S1107. The printing size S is set in advance by operating the menu button 10 and the selector buttons 11a~11d.

In step S1101, the photographing mode is switched from the standard photographing mode to the specified size photographing mode with the mode selector button 12. It is to be noted that while the printing size S is set in advance as described above, it may instead be set when switching the mode. In addition, a mark 33 indicating the printing size S may be displayed at the display LCD 3 or the display panel 7 in the specified size photographing mode as detailed later (see FIG. 21). In step S1102, a photographing operation is performed in the camera in the specified size photographing mode. In step S1103, the header information which includes the printing size setting S and the image data are recorded into the memory card 424.

In step S1104, the header information and the image data are read into the personal computer 20 from the camera 1 by, for instance, ejecting the memory card 424 from the camera 1 and loading it into the personal computer 20 shown in FIG. 3. In step S1105, image processing is executed in conformance to the printing size setting S or the printing resolution which is to be detailed later. It is to be noted that paper in the size matching the printing size S indicated at the display LCD 3 or the display panel 7 of the electronic camera 1 has been loaded into the printer 23. In step S1106, the size of the paper used in the printing operation is displayed at the display monitor 22. In step S1107, the printer 23 prints the image at the magnification factor of 1.

Figure 18:
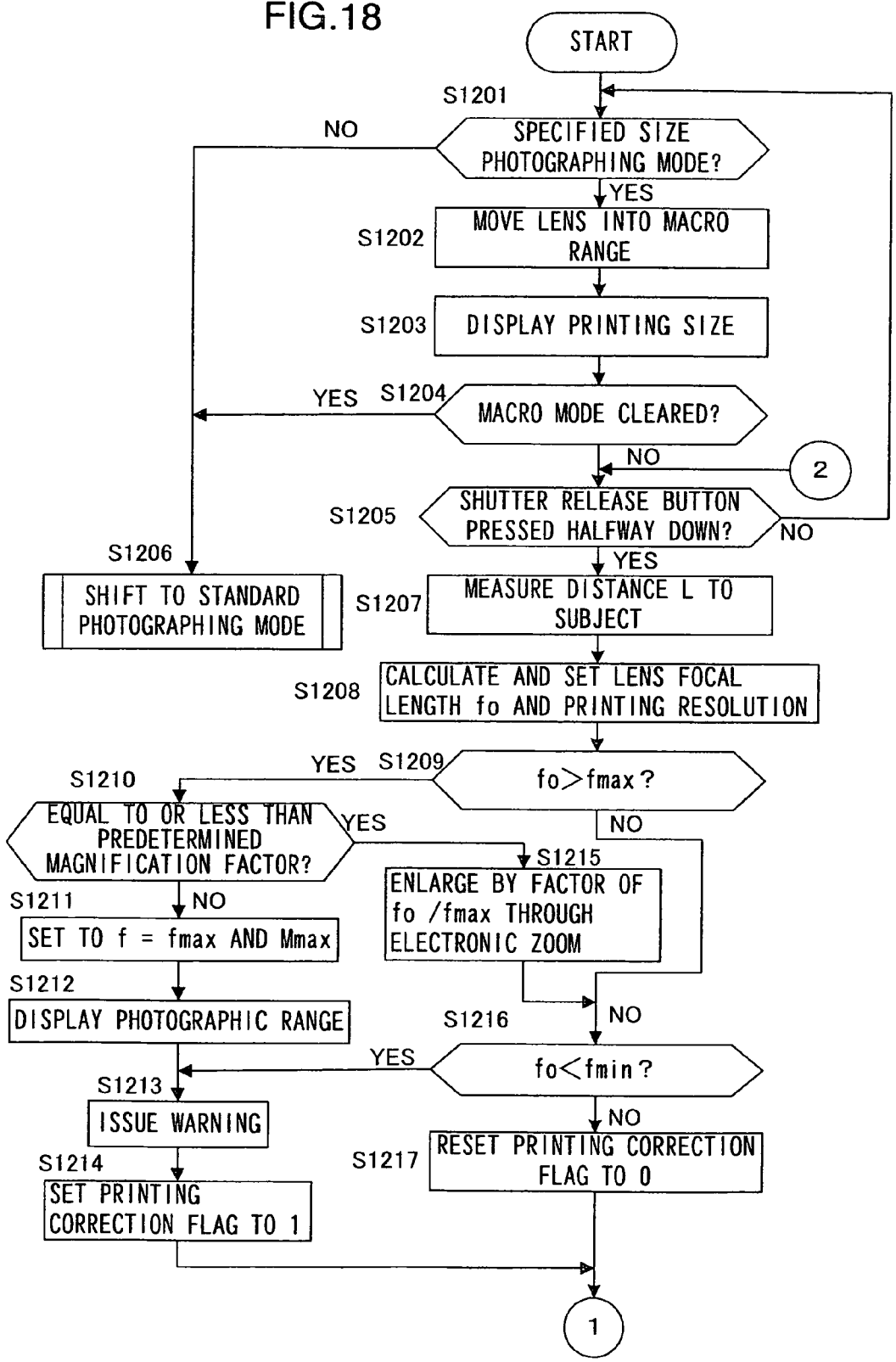
FIG. 18 presents a detailed flowchart of the procedure corresponding to steps S101 through S103 in FIG. 17.
Figure 19:
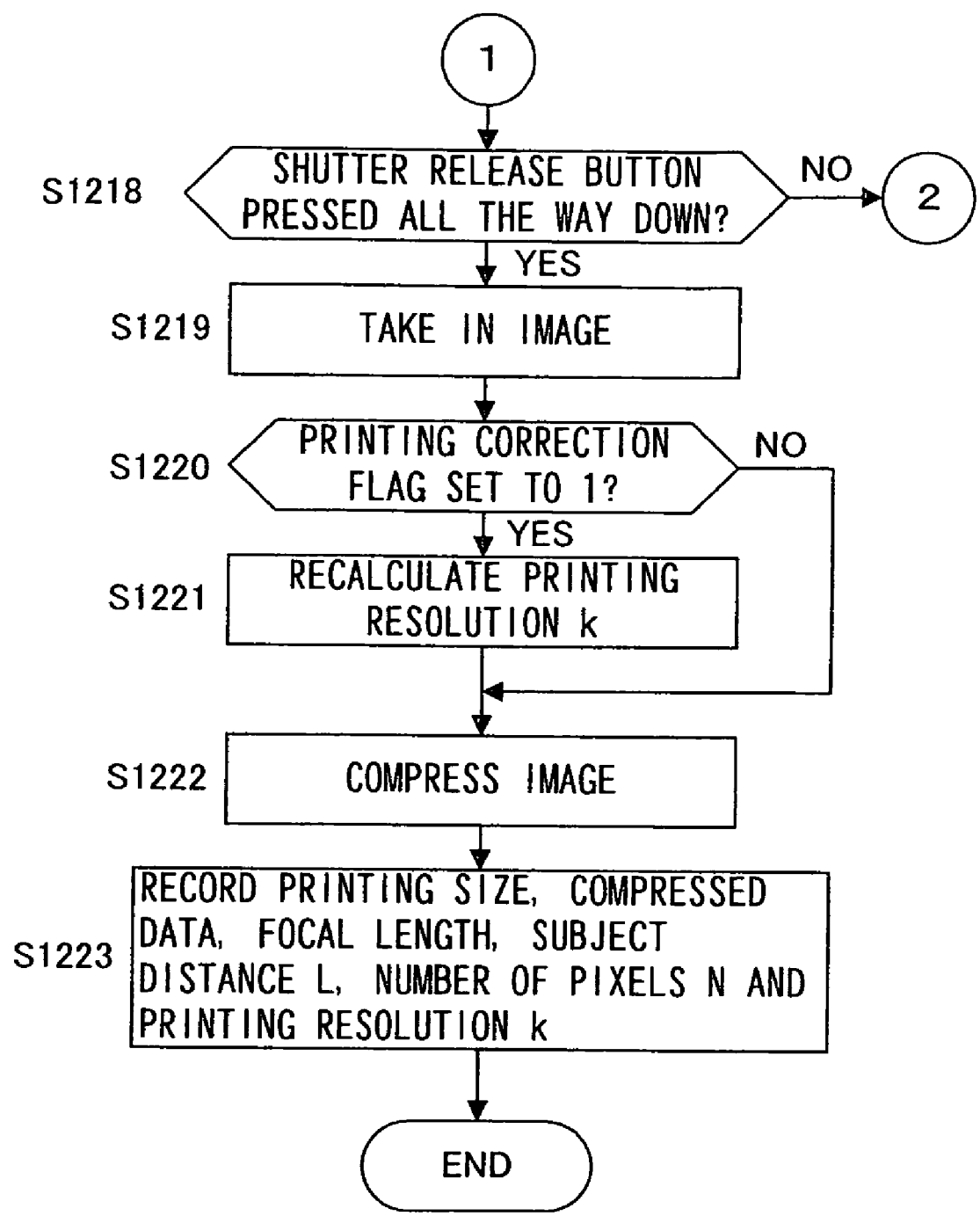
FIG. 19 presents a flowchart of the procedure continuing from FIG. 18.

Next, the procedure executed on the camera side, corresponding to steps S1101 to S1103 in FIG. 17, is explained in further detail in reference to the flowchart presented in FIGS. 18 and 19. FIGS. 18 and 19 present a flowchart of the processing procedure of a program executed in the CPU 439 at the camera 1. In step S1201, a decision is made as to whether or not the specified size photographing mode has been selected through an operation of the mode selector button 12. If it is decided in step S1201 that the specified size photographing mode has been selected, the operation proceeds to step S1202. If, on the other hand, it is decided in step S1201 that the specified size photographing mode has not been selected, i.e., the camera is currently set in the standard photographing mode, the operation proceeds to step S1206 to execute a sequence of processing in the standard photographing mode.

In step S1202, the position of the photographic optical system 2 is adjusted to a predetermined macro position. Namely, the photographic optical system 2 is automatically set to the macro position since the photographic range W matching the printing size S (e.g., A4 or B5 size) is projected over the entire image-capturing surface of the CCD 214 thereby setting the subject in an extremely close range in the specified size photographing mode. In step S1203, an indicator of the printing size S which has been set is brought up on the display LCD 3 or the display panel 7.

In step S1204, a decision is made as to whether or not the macro mode has been cleared through a user operation of an operating member (not shown). If it is decided in step S1204 that the macro mode has been cleared, the operation proceeds to step S1206, whereas if it is decided that the macro mode has not been cleared, the operation proceeds to step S1205. In step S1205, a decision is made as to whether or not the shutter release button 5 has been pressed halfway down, and the operation proceeds to step S1207 if it is decided that the shutter release button 5 has been pressed halfway down, whereas the operation returns to step S1201 if it is decided the shutter release button 5 has not been pressed halfway down.

In step S1207, a focal adjustment operation for the photographic optical system 2 is executed by the lens drive circuit 430 and the distance L to the subject during the focal adjustment operation is calculated. In step S1208, the focal length f0 at which the photographic range W matching the printing size S is projected over the entire image-capturing area and the printing resolution k which is to be detailed later are calculated.

Figure 20:
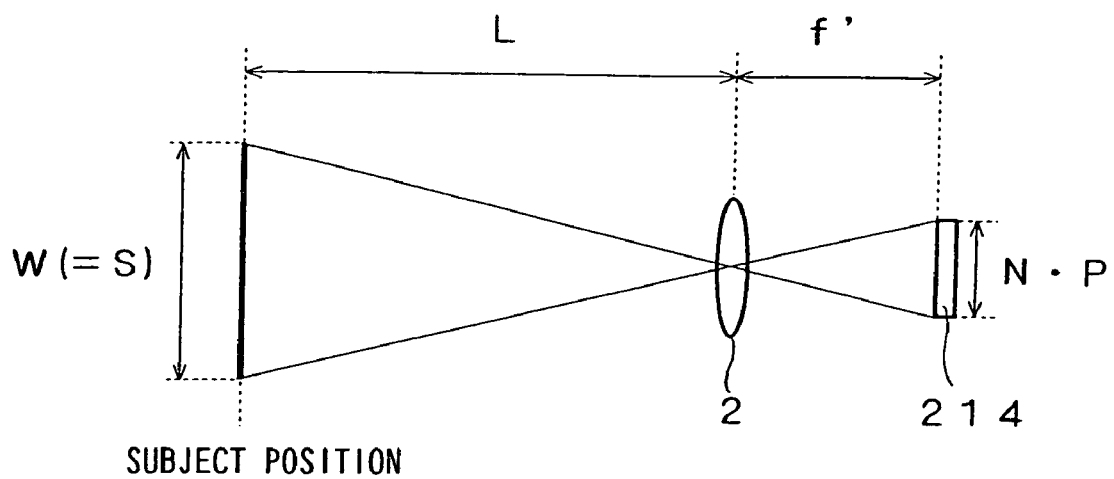
FIG. 20 shows the relationship between the photographic range W and the image-capturing surface of the CCD 214.

In FIG. 20, which shows the relationship between the subject and the CCD 214, the photographic range W matching the printing size S is projected over the entire image-capturing area at the CCD 214. It is to be noted that the letter W indicating the photographic range in FIG. 20 represents the longer side of the photographic range at the subject position, i.e., the lateral dimension of the photographic range when the camera 1 shown in FIG. 1 is held in a normal position, and corresponds to the larger value of the dimensions of the printing size S (e.g., A4 size). In addition, N indicates the number of pixels along the width of the image-capturing area at the CCD 214 and P indicates the pixel pitch. The relationship expressed in an expression (101) below is achieved by the focal length f0, the distance f' between the photographic optical system 2 and the image-capturing surface and the subject distance L at all times.

$$1/L + 1/f' = 1/f0 \quad (101)$$

When the photographic range W matching the printing size S is projected over the entire image-capturing area at the CCD 214, the following expression (102) is true for f' in FIG. 20. In other words, the focal length f0 should be adjusted so as to satisfy both expressions (101) and (102).

$$f'/L = N \cdot P/S$$

$$f' = (N \cdot P \cdot L)/S \quad (102)$$

In addition, since N pixels correspond to the dimension W (=S) (mm) as shown in FIG. 20, the printing resolution k should be set to a value expressed in an expression (103) below to print the image captured by the CCD 214 at the printing size S. In step S1208 described above, the focal length f0 is calculated by using expressions (101) and (102) and, in addition, the printing resolution k is calculated through an expression (103) below.

$$k = N/S \quad (103)$$

Figure 21A:
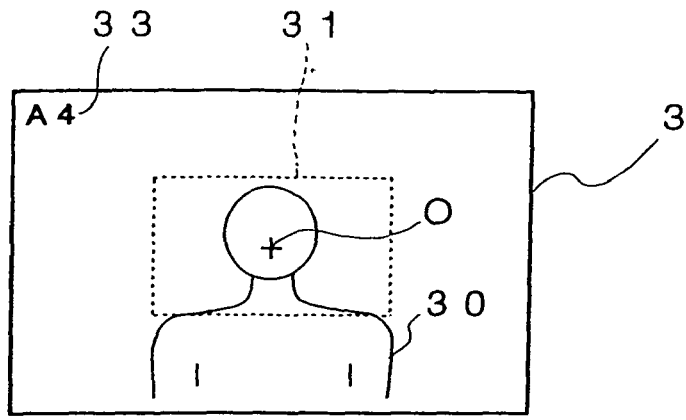
FIGS. 21A~21C show subject images displayed at the display LCD 3, with FIG. 21A showing an image obtained by setting f to fmax, FIG. 21B showing an image obtained by enlarging the image in FIG. 21A by a magnification factor of Mmax through electronic zoom and FIG. 21C showing an image obtained by enlarging the image in FIG. 21A by a magnification factor of (f0/fmax) through electronic zoom.

In step S1209, a decision is made as to whether or not the focal length f0 calculated in step S1208 is larger than the maximum focal length fmax on the telephoto side of the photographic optical system 2. If it is decided that f0☐fmax in step S1209, the operation proceeds to step S1216, whereas if it is decided that f0>fmax, the operation proceeds to step S1210. When f0>fmax, a range larger than the photographic range 31 of the subject image 30 is displayed at the display LCD 3 as shown in FIG. 21A even if the photographic optical system 2 is zoomed up to fmax.

Figure 21B:
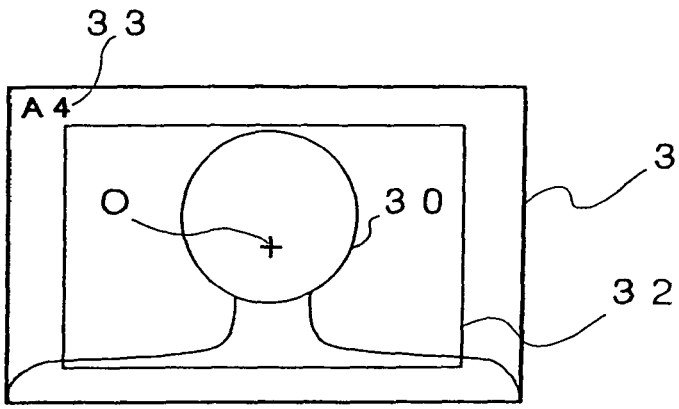

In step S1210, a decision is made as to whether or not (f0/fmax) is larger than a predetermined electronic zoom magnification factor Mmax. It is to be noted that the following explanation is given on the assumption that the term "magnification factor" indicates a degree of magnification in relation to the length instead of a magnification factor in relation to the area. If it is decided in step S1210 that (f0/fmax)>Mmax, the operation proceeds to step S1211 to set the focal length f of the photographic optical system 2 to fmax and also to set the electronic zoom magnification factor to Mmax. In step S1212, an image obtained by enlarging the image in FIG. 21A by a factor of Mmax is displayed as shown in FIG. 21B and a frame 32 indicating the printing size S is superimposed on the display of the image. It is to be noted that the mark 33 indicating the printing size S is displayed at the upper left corner of the display LCD 3. In this example presented in FIGS. 21A~21C, the printing size S is A4 and the mark 33 indicates "A4" accordingly.

In step S1213, a warning that an image cannot be photographed over the photographic range W matching the printing size S is issued. This warning may be issued by generating a warning sound through a speaker (not shown) provided at the camera 1 or by displaying a warning message at the display LCD 3 of the display panel 7. In the following step S1214, a printing correction flag (to be detailed later) is set to 1 and the operation proceeds to step S1218 in FIG. 19.

Figure 21C:
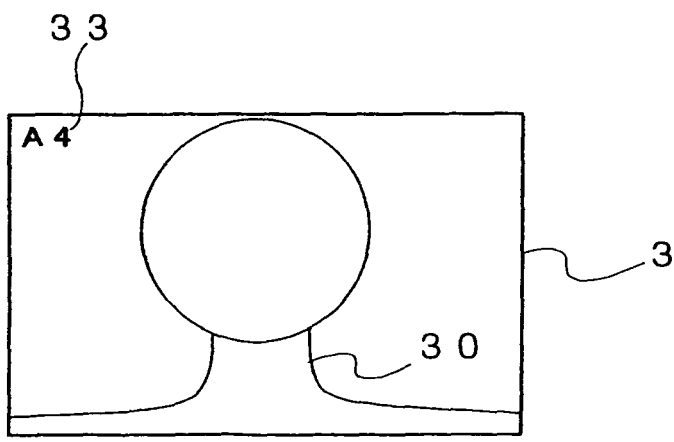

If, on the other hand, it is decided in step S1210 that (f0/fmax)☐Mmax, the operation proceeds to step S1215. In step S1215, the image over the photographic range 31 around the center O of the display LCD 3 is enlarged by a factor of (f0/fmax) through the electronic zoom function. Since the interpolation processing and the like are executed for the electronic zoom enlargement, the number of pixels in the enlarged image is equal to the number of pixels at the CCD 214, and the value calculated step S1208 for the printing resolution k can be directly used. In FIG. 21C, which shows the image obtained by enlarging the image in the photographic range 31 by the factor of (f0/fmax), an enlargement of the image in the photographic range 31 in FIG. 21A is displayed over the entire LCD 3.

In step S1216, a decision is made as to whether or not the focal length f0 calculated in step S1208 is smaller than the minimum focal length fmin on the wide-angle side. The operation proceeds to step S1213 if it is decided in step S1216 the f0<fmin, whereas the operation proceeds to step S1217 if it is decided that f0 ☐ fmin. If the operation proceeds to step S1217 from step S1216, the printing correction flag is reset to 0 in step S1217 before the operation proceeds to step S1218 in FIG. 19.

Figure 22:
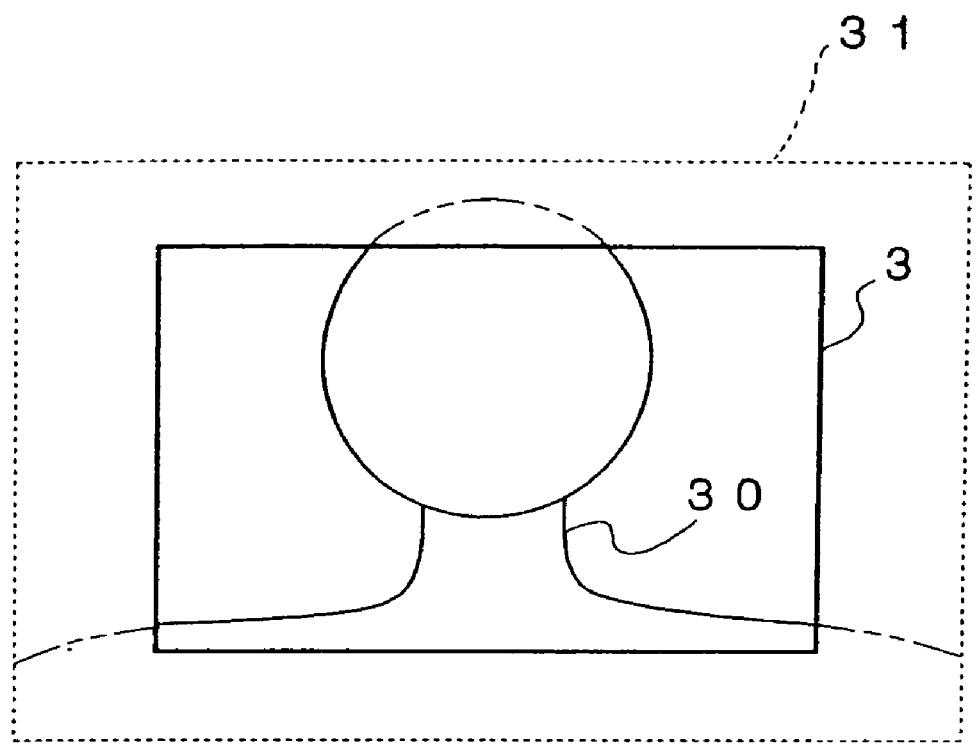
FIG. 22 shows the relationship between the photographic range 31 and the display LCD 3 which is achieved when f=fmin.

When it is decided in step S1216 that f0<fmin, on the other hand, the photographic range 31 is larger than the display LCD 3 as shown in FIG. 22 even if the focal length f0 of the photographic optical system 2 is set to the lower limit value fmin and, as a result, only a part of the subject in the range 31 is displayed. In other words, a range smaller than the photographic range 31 is projected onto the image-capturing area of the CCD 214 at the subject distance L under these circumstances.

In step S1218 in FIG. 19, a decision is made as to whether or not the shutter release button 5 has been pressed all the way down, and the operation proceeds to step S1219 if it is decided that the shutter release button 5 has been pressed all the way down, whereas the operation returns to step S1205 in FIG. 18 if it is decided that the shutter release button 5 has not been pressed all the way down. For instance, if f0<fmin, resulting in a state such as that shown in FIG. 22, the distance from the subject should be increased so as to ensure that the focal length f0 calculated in step S1208 satisfies f0 ☐ fmin, instead of pressing the shutter release button 5 all the way down in step S1218. If the shutter release button 5 is continuously held half-way down in this situation, the operation proceeds from step S1205 to step S1207, whereas if the half-way pressed state has been cleared, the operation returns from step S1205 to step S1201.

In step S1219, the image captured at the CCD 214 is taken in. In step S1220, a decision is made as to whether or not the printing correction flag is set to 1. If it is decided in step S1220 the flag is set to 1, the photographic range W is not projected onto the entire image-capturing surface of the CCD 214, and, accordingly, the operation proceeds to step S1221 to recalculate the printing resolution k. In other words, if the operation proceeds to step S1211 from step S1210 or to step S1213 from step S1216, the printing resolution k is recalculated so as to print the subject image at the magnification factor of 1.

If, on the other hand, it is decided in step S1220 that the flag is set to 0, the photographic range W is projected onto the entire image-capturing area, and, accordingly, the operation proceeds to step S1222 without recalculating the printing resolution k.

When the operation proceeds to step S1211 from step S1210 in FIG. 18, i.e., when the focal length f is set to fmax and the electronic zoom magnification factor is set to Mmax, as shown in FIG. 21B, the image displayed over the entire display LCD is not printed with the magnification factor of 1 and instead is printed at the printing size S, if it is printed at the printing resolution k calculated by using the expression (103). The subject image shown in FIG. 21C is an enlargement achieved by magnifying the subject image in FIG. 21A by a factor of (f0/fmax) and the subject image shown in FIG. 21B is obtained by enlarging the subject image in FIG. 21A by a factor of Mmax. Thus, by enlarging the image shown in FIG. 21B by a factor of (f0/fmax)/Mmax, the subject image in the frame 32 can be displayed over the entire display LCD 3. Accordingly, if the printing resolution k calculated through the expression (103) is lowered by dividing it with (f0/fmax)/Mmax as shown in an expression (104) below, the subject image in the frame 32 can be printed at the printing size S.

$$k = (N/S)/\{(f0/f\max)/M\max\} \quad (104)$$
$$= (N/S) \cdot (M\max \cdot f\max/f0)$$

If, on the other hand, the operation proceeds from step S1216 to step S1213, i.e., if the photographic range 31 is larger than the display LCD 3 as shown in FIG. 22, it is necessary to raise the printing resolution k. If the size of the image in the range 31 in the FIG. 22 is altered by a magnification factor of (f0/fmin), the size of the image becomes equal to the size of the display LCD 3. Namely, by multiplying the printing resolution k calculated by using expression (103) by a factor of (fmin/f0) as shown in an expression (105) below, the image over the range 31 can be printed at the printing size S.

$$k = (N/S) \cdot (f\min/f0) \quad (105)$$

Then, the image data are compressed in a predetermined format in step S1222. In step S1223, tag information indicating the printing size S, the printing resolution k, the focal length f, the subject distance L, the number of pixels N and the like is recorded into the memory card 424 together with the compressed image data. Thus, the sequence of processing from photographing through recording, executed at the electronic camera 1, is completed.

It is to be noted that if the printing resolution k is to be recorded in the TIFF format, the printing resolution k is recorded in units corresponding to the resolution along the width of the image, the resolution along the height of the image and the resolution along the width and the height of the image respectively defined by tag numbers 282~284. If, on the other hand, the printing resolution k is recorded in the Exif format, individual pieces of information indicating the subject distance, the lens focal length, the resolution along the height of the focal plane, the resolution along the width of the focal plane and the resolution over the focal plane as defined by tag numbers 37386, 37382, 41486~41488 are recorded and, in this case, the printing resolution k may be calculated by the printing application software program. The focal plane resolution mentioned above is the reciprocal of the pitch P of the pixels at the CCD 214.

This subject image is printed on the printer 23 connected to the personal computer 20 by taking the image data into the personal computer 20 shown in FIG. 3 as described earlier. If the printer 23 is loaded with printing paper in the printing size S, the subject image is printed at a magnification factor substantially set to 1. It is to be noted that if the peripheral area of the printing paper is to be left unprinted as a margin, the subject image is printed at a size S slightly smaller than the size corresponding to the magnification factor 1. In addition, if the printer 23 is loaded with paper that is larger than the printing size S, too, the image can be printed at the magnification factor of 1 by setting the resolution of the printing operation equal to the printing resolution k stored in memory as tag information.

The third embodiment explained above achieves the following features.

(a) When the electronic camera 1 is set in the specified size photographing mode, the photographic optical system 2 is automatically adjusted to set the photographic range to the specified size. As a result, the subject image is displayed at the display LCD 3 over a range matching the range of the image to be printed on paper in the specified size. Thus, a photographing operation can be performed while checking the state of the image as it will be printed and, as a result, a desirable subject image can be obtained through the photographing operation.

(b) If the subject distance is too large or too small, the frame 32 is brought up on display at the display LCD 3, as shown in FIG. 21B or a warning is issued to alert the user that the subject distance is not correct.

(c) By loading printing paper in a size of matching it the printing size indicated at the display LCD 3 or the display panel 7, the subject image can be printed in a size matching to the actual subject.

(d) Even if the size of the printing paper in the printer does not match the printing size indicated at the display LCD 3 or the display panel 7, the subject image can be printed at the magnification factor of 1 with ease by printing it at the printing resolution k stored in memory as tag information.

While a specific photographic range can be selected from a plurality of sizes in the third embodiment explained above, the photographic range may be set at a predetermined uniform size in the electronic camera. In such a case, the printing size may be indicated at the position of the mode selector button 12 instead of indicating the printing size at the display LCD 3 or the display panel 7. By loading the printer 23 with printing paper in the size matching the printing size indicated at the mode selector button 12, the image can be automatically printed at the magnification factor of 1.

Variation Example 1

Figure 23:
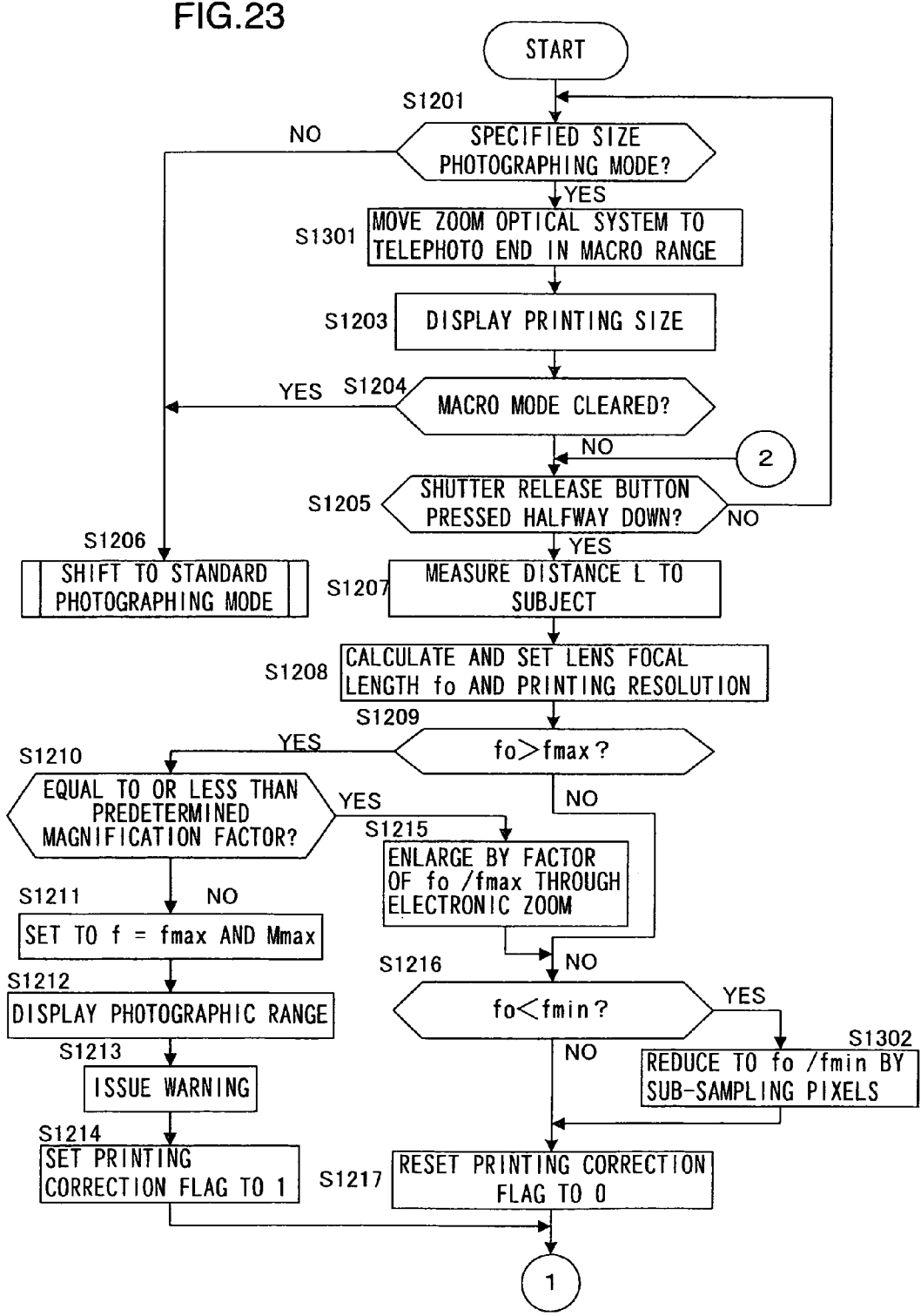
FIG. 23 presents a flowchart of the control procedure achieved in Variation Example 1.

In Variation Example 1, the control is implemented as shown in the flowchart presented in FIG. 23 instead of the flowchart presented in FIG. 18. The same step numbers are assigned to steps in the flowchart in FIG. 23 in which processing identical to that in FIG. 18 is executed, and steps S1301 and S1302 differentiate the flowchart in FIG. 23 from the flowchart in FIG. 18. In addition, since the procedure continuing from FIG. 23 is identical to that shown in FIG. 19, its illustration and explanation are omitted.

In Variation Example 1, once it is decided in step S1201 that the specified size photographing mode has been selected, the operation proceeds to step S1301 to move the photographic optical system 2 to the telephoto end in the macro range. This reduces the field depth of the lens and raises the accuracy with which the distance L is measured. As a result, the zoom magnification factor can be set with an even higher degree of accuracy.

In addition, if it is decided in step S1216 that f0<fmin, i.e., if the subject distance L is too small and thus, the photographic range 31 is still larger than the display LCD 3 as shown in FIG. 22 even with the photographic optical system 2 set at the wide-angle end (f=fmin), the operation proceeds to step S1302 to sub-sample the pixels so as to reduce the size of the photographic image by a factor of (f0/fmin). Once the sub-sampling processing in step S1302 is completed, the operation proceeds to step S1217 to reset the printing correction flag to 0. Namely, if the sub-sampling processing is executed in step S1302, it is not necessary to recalculate the printing resolution k.

Variation Example 2

Figure 24:
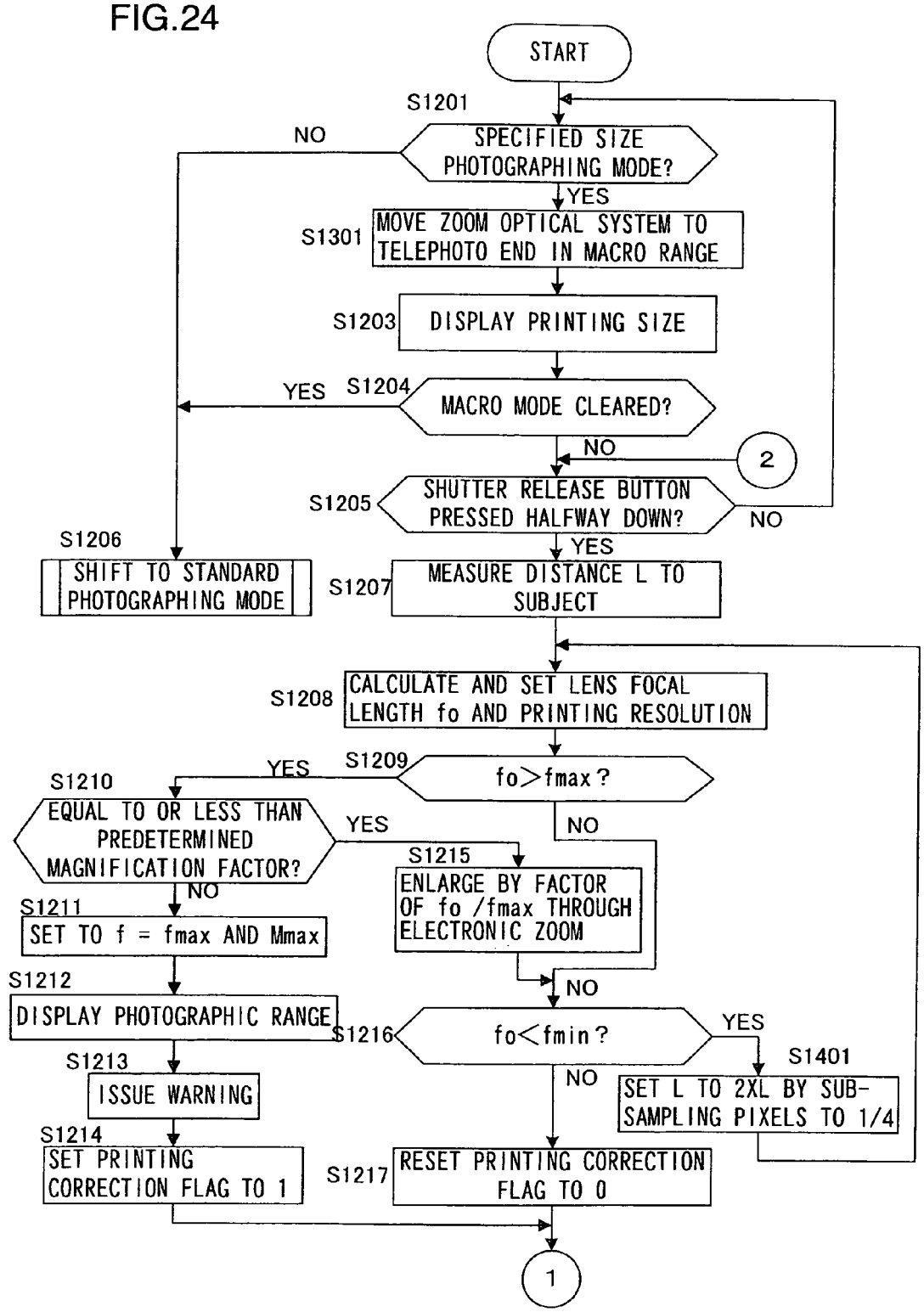
FIG. 24 presents a flowchart of the control procedure achieved in Variation Example 2.

FIG. 24 presents a flowchart similar to that in FIG. 23 as Variation Example 2. In the flowchart presented in FIG. 24, different processing is executed after it is decided in step S1216 that f0<fmin. Namely, if it is decided in step S1216 that f0<fmin, the operation proceeds to step S1401 to sub-sample pixels from the photographic image to ¼ of the original volume and also to substitute the distance L calculated and stored in memory in step S1207 with 2·L.

When the pixels are sub-sampled to ¼ of the original volume, the pixel data of the image along the horizontal direction are sub-sampled to ½ and the pixel data along the vertical direction, too, are sub-sampled to ½. As a result, the length of the sides of the printed image are halved, which is equivalent to doubling the subject distance L. Once the processing in step S1401 is completed, the operation proceeded to step S1208 to calculate the focal length f0 by using the new L that has replaced the original distance. In Variation Example 2, in which the pixels are sub-sampled to ¼ regardless of the size of the photographic image, the sub-sampling processing is simplified compared to that executed in Variation Example 1.

- Fourth Embodiment-

While the photographic range W matching the printing size S is specified and the subject image over the range W is printed at the magnification factor 1 in the third embodiment, the subject image is printed at a magnification factor of Z onto a printing paper matching a specified printing size S in the fourth embodiment. A desired printing magnification factor Z is selected by operating the buttons 11*a*~11*d*, from a plurality of printing magnification factors listed in a printing magnification factor setting menu brought up on display at the display LCD 3 through an operation of the menu button 10. When the specified size photographing mode is selected through the mode selector button 12, the photographic range W is set to a value obtained by dividing the specified printing size S by the printing magnification factor Z. It is to be noted that details of the method of photographic range setting are to be provided later. It is also to be noted that the structures of the electronic camera 1, the camera system and the like are identical to those in the first embodiment, and the following explanation focuses on the method of control implemented when printing the subject image at the magnification factor Z.

Figure 25:
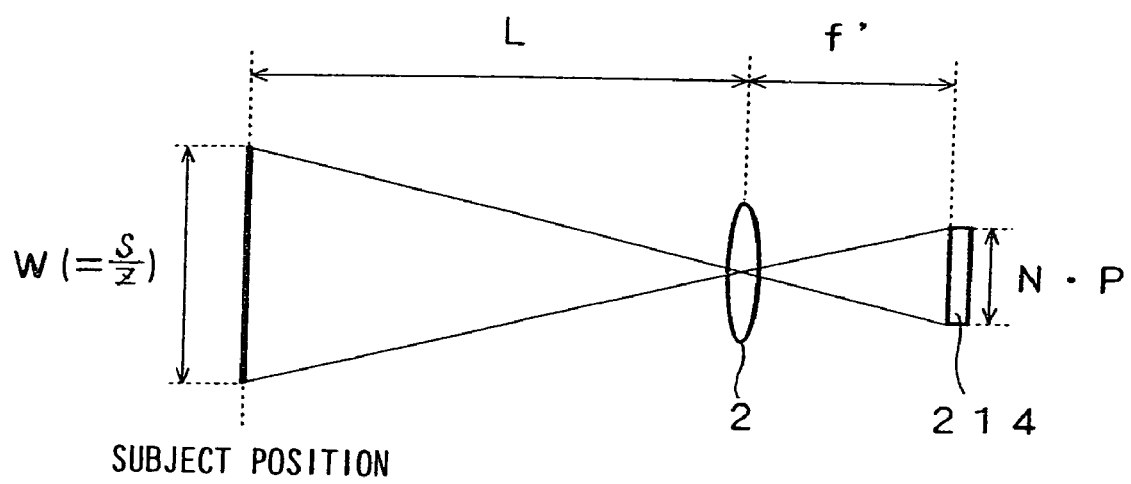
FIG. 25 shows the relationship between the photographic range W and the CCD 214 achieved in a fourth embodiment.

FIG. 25 shows the relationship between the photographic range W and the CCD 214. As in the third embodiment, the relationship expressed as an expression (101) below is achieved among the focal length f0, the distance f' between the photographic optical system 2 and the image-capturing surface and the subject distance L.

$$1/L + 1/f' = 1/f0 \qquad (101)$$

In order to print the subject image projected over the entire image-capturing area of the CCD 214 onto printing paper matching the printing size S at the magnification factor Z, the photographic range W=S/Z, calculated by multiplying the printing size S by a factor of (1/Z) needs to be projected onto the CCD 214 as shown in FIG. 25. Accordingly, the focal length f of the electronic camera 1 should be adjusted to a focal length f0 which satisfies both expression (101) and the expression (106) below. As in the third embodiment, the printing resolution k is set as expressed in the expression (103).

$$f'/L = N \cdot P/(S/Z)$$

$$f' = (N \cdot P \cdot L \cdot Z)/S \qquad (106)$$

$$k = N/S \qquad (103)$$

Since the overall procedure from the photographing operation through the printing operation executed in the camera system and the procedure executed in the camera are identical to those in the third embodiment, their explanation is omitted. However, the printing magnification factor Z, too, is stored in memory as tag information in step S1223 in FIG. 19 in the fourth embodiment. In the fourth embodiment, by loading the printer 23 with printing paper in a size matching the printing size S set for the photographing operation, the subject image is automatically printed at the magnification factor Z. As a result, the subject image can be printed at the magnification factor Z with great ease.

- Fifth Embodiment-

In the third and fourth embodiments, the printing size S is input to the electronic camera 1 and the photographic optical system 2 is controlled based upon the printing size S. In the fifth embodiment, a calibration is performed so as to project the photographic range W matching the printing-enabled range onto the CCD 214 by using a chart on which the printing-enabled range for the printer 23 is printed. It is to be noted that the calibration is executed after setting the electronic camera 1 in a calibration mode by, for instance, operating the command dial 6 shown in FIG. 1.

Before the calibration, the chart of the printing-enabled range should be printed in advance with the printer 23. Under normal circumstances, the peripheral area of the printing paper is an area over which printing is disabled and is, therefore, left blank, and the rectangular area further inward relative to the peripheral area of the printing paper is the printing-enabled range. For instance, when A4 size paper is used, an image is printed in a rectangular frame which is slightly smaller than A4 size.

Figure 26:
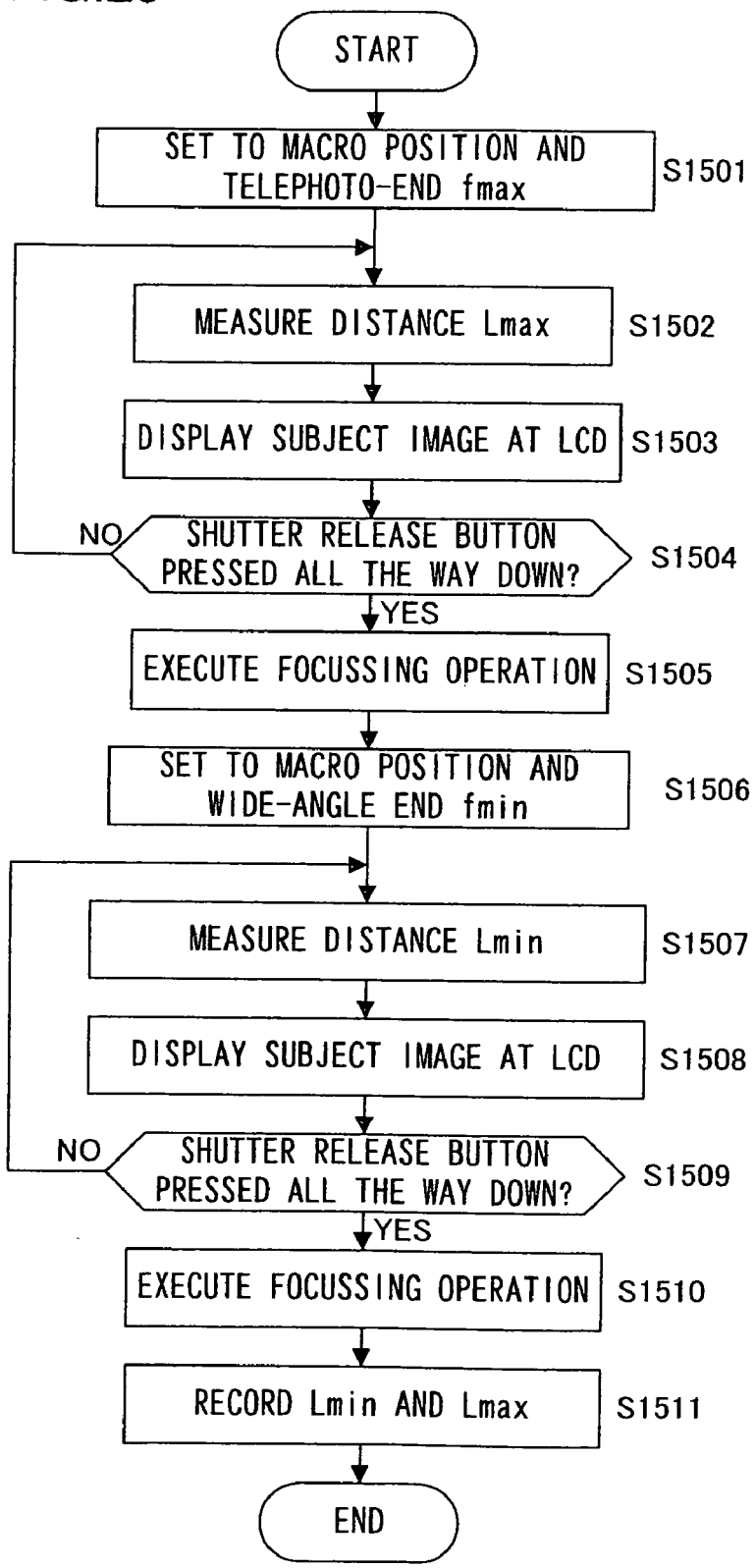
FIG. 26 presents a flowchart of the calibration procedure.

FIG. 26 presents a flowchart of the calibration procedure, which starts as the calibration mode is set with the command dial 6. In step S1501, the photographic optical system 2 of the electronic camera 1 is first set in the micro range and then the focal length is set to the maximum telephoto end (fmax). In this state, with the photographic optical system 2 and the focal length sustaining the setting statuses selected in step S1501, the user holds the electronic camera 1 toward the chart.

In step S1502, the distance Lmax to the chart is measured. In step S1503, an image of the chart captured by the electronic camera 1 is brought up on display at the display LCD 3. The user moves closer to, or further away from the chart until the rectangular frame of the chart on display becomes completely aligned with the display frame at the display LCD 3. Then, once the rectangular frame of the chart and the display frame of the display LCD 3 are completely aligned with each other, the user presses the shutter release button 5 all the way down.

In step S1504, a decision is made as to whether or not the shutter release button 5 of the electronic camera 1 has been pressed all the way down, and the operation proceeds to step S1505 if an affirmative decision (YES) is made, whereas the operation returns to step 1502 if a negative decision (NO) is made. In the calibration mode, the operation proceeds to step S1505 after the shutter release button 5 is pressed all the way down to execute a focussing operation alone.

In step S1506, the photographic optical system 2 is set in the macro range and then the focal length is set to the minimum wide-angle end (fmin). Next, the user holds the electronic camera 1 toward the chart again. In step S1507, the distance Lmin to the chart is measured, and in the following step S1508, an image of the chart is displayed at the display LCD 3. In this case, too, the user moves closer to or further away from the chart until the rectangular frame of the chart matches the display frame of the display LCD 3, and the user then presses the shutter release button 5 all the way down when the rectangular frame and the display frame are completely aligned with each other.

In step S1509, a decision is made as to whether or not the shutter release button 5 has been pressed all the way down and the operation proceeded to step S1510 if an affirmative decision (YES) is made, whereas the operation returns to step S1507 if a negative decision (NO) is made. Subsequently, after a focussing operation is executed in step S1510, the distances Lmin and Lmax are stored in memory in step S1511 before the sequence of the calibration processing ends.

After the calibration processing, the electronic camera 1 is controlled so as to set the focal length to f0 calculated through an expression (107) based upon the distances Lmin and Lmax stored in memory in the specified size photographing mode. As a result, the photographic range W matching the size of the rectangular frame of the chart is projected onto the entire image-capturing area of the CCD 214, and the photographed subject image can be printed onto printing paper in size S at the magnification factor of 1.

$$f0 = fmin + \{(fmax - fmin)/(Lmax - Lmin)\} \cdot (L - Lmin) \quad (107)$$

In the third and fourth embodiments explained earlier, the photographic range W matching the printing size S is projected over the entire image-capturing area of the CCD 214 by adjusting the focal length f0 so that f' in FIG. 20 satisfies the following expressions (101) and (102). However, factors such as an error attributable to inconsistency among individual lenses are not taken into consideration in expression (102) and, for this reason, expression (102) may be modified to expression (108) for higher accuracy by using an error correction coefficient α. In other words, in the third and fourth embodiments, in which the correction coefficient α is not used, the accuracy of the focal adjustment is poorer.

$$1/L + 1/f' = 1/f0 \quad (101)$$

$$f' = (N \cdot P \cdot L)/W \quad (102)$$

$$f' = (N \cdot P \cdot L)/(W \cdot \alpha) \quad (108)$$

However, since the focal length f0 is calculated based on the data Lmin and Lmax obtained by actually projecting the rectangular frame of the chart over the entire image-capturing area of the CCD 214 in the fifth embodiment, the focal length f0 is calculated by taking into consideration the effect of any lens error. For this reason, a higher degree of accuracy is achieved in the control compared to the third and fourth embodiments.

While an explanation is given above in reference to the third and fourth embodiments on an example in which the electronic camera and the camera system achieve both the optical zoom function and the electronic zoom function, the present invention may also be adopted in an electronic camera and a camera system achieving only either of these functions. In addition, while the printing resolution k is calculated at the camera, it may instead be calculated at the means for printing based upon the number of pixels N and the printing size S taken from the camera into the means for printing (the PC 20 and the printer 23).

It is to be noted that while the printing resolution k is calculated in the electronic camera 1 in the embodiments described above, the printing resolution k may instead be calculated in the personal computer or the printer 23 on the printing side based upon the subject distance L, the focal length f, the number of pixels N, the pixel pitch P and the printing magnification factor M recorded as the tag information, as explained earlier. In the latter case, the control program executed at the personal computer 20 may be provided in a recording medium such as a CD-ROM or through a data signal on the Internet or the like.

Figure 27:
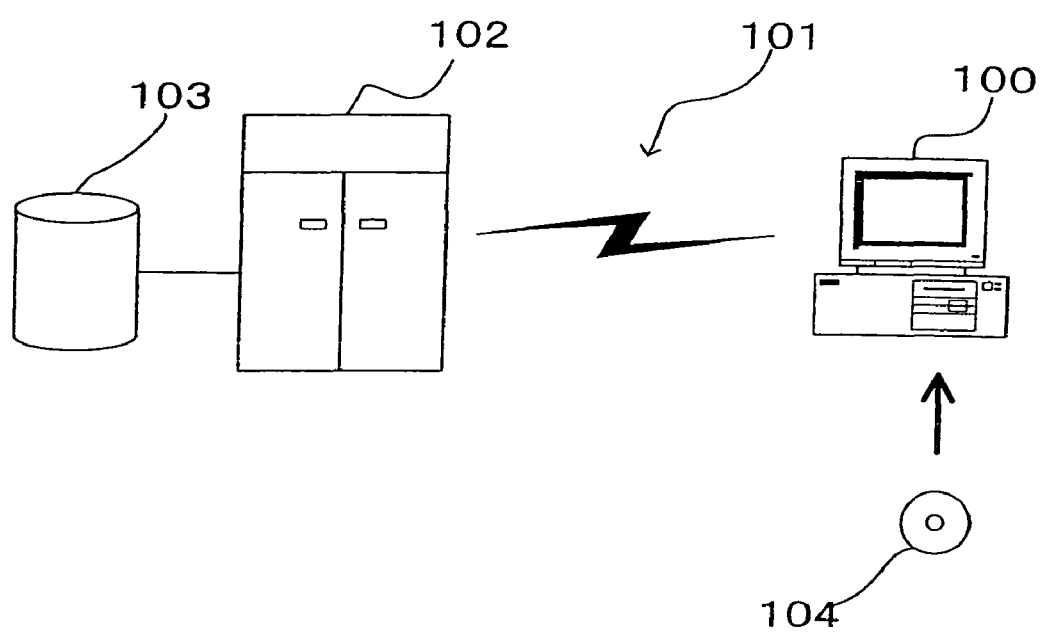

FIG. 27 shows how this may be achieved. A personal computer 100 corresponds to the personal computer 20. The personal computer 100 receives the program via a CD-ROM 104. In addition, the personal computer 100 can be connected to a communication line 101. In a computer 102, i.e., the server computer that provides the program, the program is stored in a recording medium such as a hard disk 103. The communication line 101 may be a communication line for Internet communication, personal computer communication or the like or it may be a dedicated communication line. The computer 102 reads out the program from the hard disk 103 and transmits the program to the personal computer 100 via the communication line 101. In other words, the program is embodied as a data signal on a carrier wave which is transmitted via the communication line 101. Thus, the program can be distributed as a computer-readable computer program product assuming any of various forms such as a recording medium and a carrier wave.

In addition, the control program according to the present invention, which is executed within the electronic camera in the embodiments is normally installed in a ROM or the like during the manufacturing process. However, by installing the control program in a ROM which allows an overwrite and connecting the ROM to a computer assuming a structure achieved by combining the structures shown in FIGS. 3 and 17, a program upgrade can be received from a recording medium such as a CD-ROM via the computer. Furthermore, the program upgrade can be provided via the Internet or the like in a manner similar to that explained earlier.

The above described embodiments are examples, and various modifications can be made without departing from the spirit and scope of the invention.

What is claimed is:

1. An electronic camera comprising:
   a zoom changing unit configured to change a focal length of a zoom lens;
   an image-capturing unit configured to execute photoelectric conversion for a subject image projected by the zoom lens onto an image-capturing area;
   a range finding unit configured to detect a distance to a subject;
   an input unit configured to input a printing size;
   a zoom control unit configured to control the zoom changing unit based upon the printing size that has been input and the subject distance; and
   a display monitor at which a range indicator mark indicating a range substantially corresponding to the printing size superimposed on the subject image are brought up on display when the focal length of the zoom lens is at a maximum and a size of a range of the subject projected almost over an entirety of the image-capturing area is larger than the printing size.

2. An electronic camera comprising:
a zoom changing unit configured to change a focal length of a zoom lens;
an image-capturing unit configured to execute photoelectric conversion for an image of a subject projected by the zoom lens onto an image-capturing area;
a range finding unit configured to detect a distance to a subject;
an input unit configured to input a printing size;
a mode setting unit operated to set a specified range photographing mode in which a size of the photographic range at a subject position is fixed at the printing size;
a zoom control unit configured to control the zoom changing unit based upon the printing size and the subject distance when the specified range photographing mode is set; and
a display monitor at which a range indicator mark indicating a range substantially corresponding to the printing size superimposed on the subject image are brought up on display when the focal length of the zoom lens is at a maximum and a size of a range of the subject projected almost over an entirety of the image-capturing area is larger than the printing size.

3. An electronic camera according to claim 2, further comprising:
a magnification factor setting unit configured to set a printing magnification factor, wherein:
the mode setting unit fixes the size of the photographic range at the subject position to a size calculated by dividing the printing size by the printing magnification factor.

4. An electronic camera according to claim 2, further comprising:
a storage control unit configured to store image information over the range indicated by the range indicator mark into a storage area.

5. An electronic camera according to claim 4, wherein:
the storage control unit stores the printing size into the storage area in correspondence to the image information.

6. An electronic camera according to claim 2, further comprising:
an electronic zoom unit configured to electronically enlarge a part of a subject image achieved based upon image information provided by the image-capturing unit; and
an electronic zoom control unit configured to control the electronic zoom unit when the focal length of the zoom lens is at a maximum and a size of a range of the subject projected almost over the entirety of the image-capturing area is larger than the printing size, so as to enlarge an image corresponding to the subject within the photographic range in the subject image achieved based upon the image information from the image-capturing unit to a size matching a size of the subject image.

7. An electronic camera according to claim 2, further comprising:
a warning unit configured to issue a warning if the focal length of the zoom lens is at a minimum and a size of a range of the subject projected almost over the entirety of the image-capturing area is smaller than the size of the photographic range.

8. An electronic camera according to claim 2, further comprising:
a sub-sampling unit configured to electronically sub-sample the subject image when the focal length of the zoom lens is at a minimum and a size of a range of the subject projected almost over the entirety of the image-capturing area is smaller than the size of the photographic range.

9. An electronic camera according to claim 2, further comprising:
a display unit at which a mark indicating the printing size is displayed.

10. An electronic camera comprising:
a zoom changing unit configured to change a focal length of a zoom lens;
an image-capturing unit configured to execute photoelectric conversion for an image of a subject projected by the zoom lens onto an image-capturing area;
a range finding unit configured to detect a distance to a subject;
an input unit configured to input a printing size;
a magnification factor setting unit configured to set a printing magnification factor;
a mode setting unit operated to set a specified range photographing mode in which a size of the photographic range at a subject position is fixed at a value obtained by dividing the printing size by the printing magnification factor;
a focal length calculating unit configured to:
calculate a focal length at which the photographic range is projected almost over an entirety of the image-capturing area when the specified range photographing mode is set,
change a focal length of the zoom lens to a first focal length and a second focal length by the zoom changing unit,
detect a first reference image distance and a second reference image distance, which are respectively distances from the electronic camera to a first reference image and a second reference image at the first and the second focal lengths, respectively, when a size of a range of the subject projected almost over the entirety of the image-capturing area is almost the same, and
calculate the focal length of the zoom lens when a size of a range of the subject projected almost over the entirety of the image-capturing area based upon the first and the second focal lengths, the first and the second reference image distances, and the distance to a subject detected by the range finding unit; and
a zoom control unit configured to control the zoom changing unit so as to match the focal length of the zoom lens with the focal length calculated at the focal length calculating unit.

11. An electronic camera comprising:
a zoom changing unit configured to change a focal length of a zoom lens;
an image-capturing unit configured to execute photoelectric conversion for a subject image projected by the zoom lens onto an image-capturing area;
a range finding unit configured to detect a distance to a subject;
an input unit configured to input a printing size;
a mode setting unit operated to set a specified range photographic mode in which a size of a photographic range at the subject position is fixed to the printing size;

an electronic zoom unit configured to electronically enlarge a part of a subject image achieved based upon image information provided by the image-capturing unit;

an electronic zoom control unit configured to control, the electronic zoom unit so as to enlarge an image corresponding to the photographic range in the subject image to a size matching a size of the subject image; and a display monitor at which a range indicator mark indicating a range substantially corresponding to the photographic range superimposed on the subject image are brought up on display when a focal length of a zoom lens is at a maximum and a size of a range of the subject projected almost over an entirety of the image-capturing area is larger than the printing size.

12. A camera system comprising:

a zoom changing unit configured to change a focal length of a zoom lens;

an image-capturing unit configured to execute photoelectric conversion for an image of a subject projected by the zoom lens onto an image-capturing area;

a range finding unit configured to detect a distance to a subject;

an input unit configured to input a printing size;

a mode setting unit operated to set a specified range photographing mode in which a size of the photographic range at a subject position is fixed at the printing size; and a display monitor at which a range indicator mark indicating a range substantially corresponding to the printing size superimposed on the subject image are brought up on display when the focal length of the zoom lens is at a maximum and a size of a range of the subject projected almost over an entirety of the image-capturing area is larger than the printing size.

13. An electronic camera comprising:

a zoom changing unit configured to change a focal length of a zoom lens;

an image-capturing unit configured to execute photoelectric conversion for a subject image projected by the zoom lens onto an image-capturing area;

an input unit configured to input a printing size;

a range finding unit configured to detect a distance to a subject;

a calculating unit configured to calculate (1) a focal length of the zoom lens based upon the printing size, the distance to a subject, a number of pixels along a width of the image-capturing area of the image-capturing unit, and a pitch of the pixels, and (2) a printing resolution based upon the printing size and the number of pixels along the width of the image-capturing area of the image-capturing unit;

a recording unit configured to record subject image data with tag information into a recording area; and a display monitor on which an image of the subject is displayed; wherein:

the tag information includes the printing size, the printing resolution, the focal length, the distance to a subject, and the number of pixels.

14. An electronic camera according to claim 13, further comprising:

an electronic zoom control unit configured to control an electronic zoom unit, wherein:

when the focal length calculated by the calculating unit is larger than a maximum focal length of the zoom lens and a value obtained by dividing the focal length by the maximum focal length is larger than a predetermined electronic zoom magnification factor:

the zoom changing unit sets the zoom lens at the maximum focal length, the electronic zoom control unit sets the electronic zoom magnification factor to maximum value, the calculating unit recalculates the printing resolution based upon the focal length, the maximum focal length of the zoom lens, and the predetermined electronic zoom magnification factor, the recording unit records an enlarged subject image which is enlarged based upon the recalculated printing resolution with the tag information including the printing size, the recalculated printing resolution, the focal length, the distance to a subject, and the number of pixels, and the display monitor displays a range indicator mark indicating a photographic range superimposed on the display of the enlarged subject image.

15. An electronic camera according to claim 13, further comprising:

an electronic zoom control unit configured to control an electronic zoom unit, wherein:

when the focal length calculated by the calculating unit is larger than a maximum focal length of the zoom lens and a value obtained by dividing the focal length by the maximum focal length is smaller than a predetermined electronic zoom magnification factor:

the zoom changing unit sets the zoom lens at the maximum focal length, the electronic zoom control unit sets the electronic zoom magnification factor to a value which divides the focal length by the maximum focal length, the recording unit records the subject image with the tag information including the printing size, the printing resolution, the focal length, the distance to a subject, and the number of pixels, and the display monitor displays the subject image.

16. An electronic camera according to claim 13, wherein:

when the focal length calculated by the calculating unit is smaller than a maximum focal length of the zoom lens:

the zoom changing unit sets the zoom lens at the minimum focal length, (1) the calculating unit recalculates an enlarged printing resolution based upon the calculated focal length and the minimum focal length, the recording unit records a lowered subject image which is lowered based upon the recalculated printing resolution with the tag information including the printing size, the recalculated enlarged printing resolution, the focal length, the distance to a subject, and the number of pixels, and the display monitor displays the subject image, or (2) the calculating unit recalculates a sub-sampled subject image based upon the focal length and the minimum focal length, the recording unit records a lowered subject image which is lowered based upon the recalculated printing resolution with the tag information including the printing size, the recalculated enlarged printing resolution, the focal length, the distance to a subject, and the number of pixels, and the display monitor displays the sub-sampled subject image.

* * * * *